(12) United States Patent
Seroussi et al.

(10) Patent No.: US 7,436,969 B2
(45) Date of Patent: Oct. 14, 2008

(54) METHOD AND SYSTEM FOR OPTIMIZING DENOISING PARAMETERS USING COMPRESSIBILITY

(75) Inventors: Gadiel Seroussi, Cupertino, CA (US); Sergio Verdu, Princeton, NJ (US); Marcelo Weinberger, San Jose, CA (US); Itschak Weissman, Menlo Park, CA (US); Erik Ordentlich, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 10/934,200

(22) Filed: Sep. 2, 2004

(65) Prior Publication Data

US 2006/0047484 A1    Mar. 2, 2006

(51) Int. Cl.
*H04B 15/00* (2006.01)
(52) U.S. Cl. ............. 381/94.1; 704/226; 704/228; 382/252; 382/275
(58) Field of Classification Search ......... 381/1, 381/17–18, 98, 27, 94.1–94.7, 106, 73.1; 455/7, 67.11, 130, 255; 375/326, 252, 240.12, 375/240.24, 347, 259; 370/529, 487, 509, 370/342, 474; 704/200.1, 229, 226, 228; 382/252, 275
See application file for complete search history.

(56) References Cited

U.S. PATENT DOCUMENTS

| | | | |
|---|---|---|---|
| 6,309,424 B1 * | 10/2001 | Fallon | 341/51 |
| 6,795,559 B1 * | 9/2004 | Taura et al. | 381/94.8 |
| 6,799,164 B1 * | 9/2004 | Araki | 704/500 |
| 6,868,378 B1 * | 3/2005 | Breton | 704/233 |
| 6,963,649 B2 * | 11/2005 | Vaudrey et al. | 381/94.7 |
| 7,107,212 B2 * | 9/2006 | Van Der Vleuten et al. | 704/229 |
| 7,209,056 B2 * | 4/2007 | Moriya et al. | 341/51 |
| 2003/0053708 A1 * | 3/2003 | Kryukov et al. | 382/261 |
| 2003/0093269 A1 * | 5/2003 | Attias et al. | 704/226 |
| 2004/0102906 A1 * | 5/2004 | Roder | 702/22 |

* cited by examiner

*Primary Examiner*—Vivian Chin
*Assistant Examiner*—Disler Paul

(57) ABSTRACT

In various embodiments of the present invention, a noisy signal denoiser is tuned and optimized by selecting denoiser parameters that provide relatively highly compressible denoiser output. When the original signal can be compared to the output of a denoiser, the denoiser can be accurately tuned and adjusted in order to produce a denoised signal that resembles as closely as possible the clear signal originally transmitted through a noise-introducing channel. However, when the clear signal is not available, as in many communications applications, other methods are needed. By adjusting the parameters to provide a denoised signal that is globally or locally maximally compressible, the denoiser can be optimized despite inaccessibility of the original, clear signal.

15 Claims, 19 Drawing Sheets

$$\Pi = \begin{bmatrix} \pi_1 & \pi_2 & \pi_3 & \cdots & \pi_n \\ Pa_1 \to a_1 & Pa_1 \to a_2 & Pa_1 \to a_3 & \cdots & Pa_1 \to a_n \\ Pa_2 \to a_1 & Pa_2 \to a_2 & Pa_2 \to a_3 & \cdots & Pa_2 \to a_n \\ Pa_3 \to a_1 & Pa_3 \to a_2 & Pa_3 \to a_3 & \cdots & Pa_3 \to a_n \\ \vdots & \vdots & \vdots & & \vdots \\ Pa_n \to a_1 & Pa_n \to a_2 & Pa_n \to a_3 & \cdots & Pa_n \to a_n \end{bmatrix} \quad 216$$

Figure 2C

|   |   |     |     |    |   |   |
|---|---|-----|-----|----|---|---|
| 0 | 0 | 255 | 255 | 10 | 0 | 0 |
| 0 | 0 | 255 | 0 | 10 | 0 | 0 |
| 18 | 0 | 255 | 0 | 255 | 0 | 0 |
| 0 | 0 | 255 | 255 | 125 | 0 | 0 |
| 0 | 0 | 255 | 0 | 0 | 0 | 6 |
| 0 | 0 | 251 | 0 | 0 | 0 | 0 |
| 0 | 223 | 255 | 0 | 0 | 0 | 0 |

$$\begin{matrix} \lambda_1 & \lambda_2 & \lambda_3 & \cdots & \lambda_n \end{matrix}$$

$$\begin{bmatrix} da_1 \rightarrow a_1 & da_1 \rightarrow a_2 & da_1 \rightarrow a_3 & \cdots & da_1 \rightarrow a_n \\ da_2 \rightarrow a_1 & da_2 \rightarrow a_2 & da_2 \rightarrow a_3 & \cdots & da_2 \rightarrow a_n \\ da_3 \rightarrow a_1 & da_3 \rightarrow a_2 & da_3 \rightarrow a_3 & \cdots & da_3 \rightarrow a_n \\ \vdots & \vdots & \vdots & & \vdots \\ da_n \rightarrow a_1 & da_n \rightarrow a_2 & da_n \rightarrow a_3 & \cdots & da_n \rightarrow a_n \end{bmatrix}$$

$$\Lambda$$

Figure 6

$$\begin{bmatrix} da_1 \rightarrow a_x \\ da_2 \rightarrow a_x \\ \vdots \\ da_n \rightarrow a_x \end{bmatrix} \odot \begin{bmatrix} Pa_1 \rightarrow a_\alpha \\ Pa_2 \rightarrow a_\alpha \\ Pa_3 \rightarrow a_\alpha \\ \vdots \\ Pa_n \rightarrow a_\alpha \end{bmatrix} = \begin{bmatrix} da_1 \rightarrow a_x \; Pa_1 \rightarrow a_\alpha \\ da_2 \rightarrow a_x \; Pa_2 \rightarrow a_\alpha \\ da_3 \rightarrow a_x \; Pa_3 \rightarrow a_\alpha \\ \vdots \\ da_n \rightarrow a_x \; Pa_n \rightarrow a_\alpha \end{bmatrix}$$

$$\lambda_{a_x} \qquad\qquad \pi_{a_\alpha} \qquad\qquad \lambda_{a_x} \odot \pi_{a_\alpha}$$

Figure 7

$$\begin{bmatrix} \\ \\ \\ \\ \\ \\ \end{bmatrix} \times \begin{bmatrix} \lambda_{a_x} \odot \pi_{a_\alpha} \end{bmatrix} = \text{distortion expected for replacing } a_\alpha \text{ in } ba_\alpha c \text{ in } s_{noisy} \text{ by } a_x$$

$q^T(s_{noisy}, s_{clear}, b, c)$

Figure 8

$$\begin{bmatrix} 361 & 7 & 321 & 14 & 81 & 25 \end{bmatrix} \times \begin{bmatrix} \Pi^{-1} \end{bmatrix} \cong \begin{bmatrix} 325 & 18 & 340 & 16 & 41 & 30 \end{bmatrix}$$

$m^T(s_{noisy}, b, c)$           $q^T(s_{noisy}, s_{clear}, b, c)$

Figure 9

| string | code |
|--------|------|
| 0 | 0001 |
| 01 | 0010 |
| 00 | 0011 |
| 011 | 0100 |
| 010 | 0101 |
| 0100 | 0110 |
| 000 | 0111 |
| 1 | 1000 |
| 0101 | 1001 |
| 10 | 1010 |
| 0001 | 1011 |
| 01000 | 1100 |
| 11 | 1101 |
| ⋮ | ⋮ |

METHOD AND SYSTEM FOR OPTIMIZING DENOISING PARAMETERS USING COMPRESSIBILITY

TECHNICAL FIELD

The present invention is related to denoising of noisy signals and, in particular, to a method for optimizing a denoiser by monitoring the compressibility of the denoiser's output and tuning the denoiser to produce increasingly compressible denoised signals.

BACKGROUND OF THE INVENTION

A large body of mathematical and computational techniques has been developed in the area of reliable signal transmission through noise-introducing channels. These different techniques depend on assumptions made with regard to the noise-introducing channel, as well as on the amount and nature of information available, during denoising, regarding the original signal. The denoising process may be characterized by various computational efficiencies, including the time complexity and working-data-set complexity for a particular computational method, as well as by the amount of distortion, or noise, remaining in a recovered signal following denoising with respect to the originally transmitted, clear signal. Although methods and systems for denoising noisy signals have been extensively studied, and signal denoising is a relatively mature field, developers, vendors, and users of denoising methods and systems, and of products that rely on denoising, continue to recognize the need for improved denoising techniques.

SUMMARY OF THE INVENTION

In various embodiments of the present invention, a noisy signal denoiser is tuned and optimized by selecting denoiser parameters that provide relatively highly compressible denoiser output. When the original signal can be compared to the output of a denoiser, the denoiser can be accurately tuned and adjusted in order to produce a denoise signal that resembles as closely as possible the clear signal originally transmitted through a noise-introducing channel. However, when the clear signal is not available, as in many communications applications, other methods are needed. By adjusting the parameters to provide a denoised signal that is globally or locally maximally compressible, the denoiser can be optimized despite inaccessibility of the original, clear signal.

BRIEF DESCRIPTION OF THE DRAWINGS

FIGS. 2A-D illustrate a motivation for a discrete denoiser related to characteristics of the noise-introducing channel.

FIG. 6 displays one form of the symbol-transformation distortion matrix $\Lambda$.

FIG. 7 illustrates computation of the relative distortion expected from replacing a symbol "$\alpha_a$" in a received, noisy signal by the symbol "$\alpha_x$."

FIG. 8 illustrates use of the column vector $\lambda_{\alpha_x} \Box \pi_{\alpha_a}$ to compute a distortion expected for replacing the center symbol $\alpha_a$ in the metasymbol b$\alpha_a$c in a noisy signal "$s_{noisy}$" by the replacement symbol $\alpha_x$.

FIG. 9 shows estimation of the counts of the occurrences of symbols "$\alpha_1$"-"$\alpha_n$" for the clean signal.

FIGS. 11A-B illustrate the Lempel-Ziv lossless data compression.

DETAILED DESCRIPTION OF THE INVENTION

Embodiments of the present invention relate to optimization of signal denoisers. In a first subsection, below, a discrete denoiser, referred to as the "DUDE," is described. In a second subsection, a lossless compression technique is described. In a final, third subsection, methods that optimize a denoiser using compression are discussed.

Dude

Figure 1:
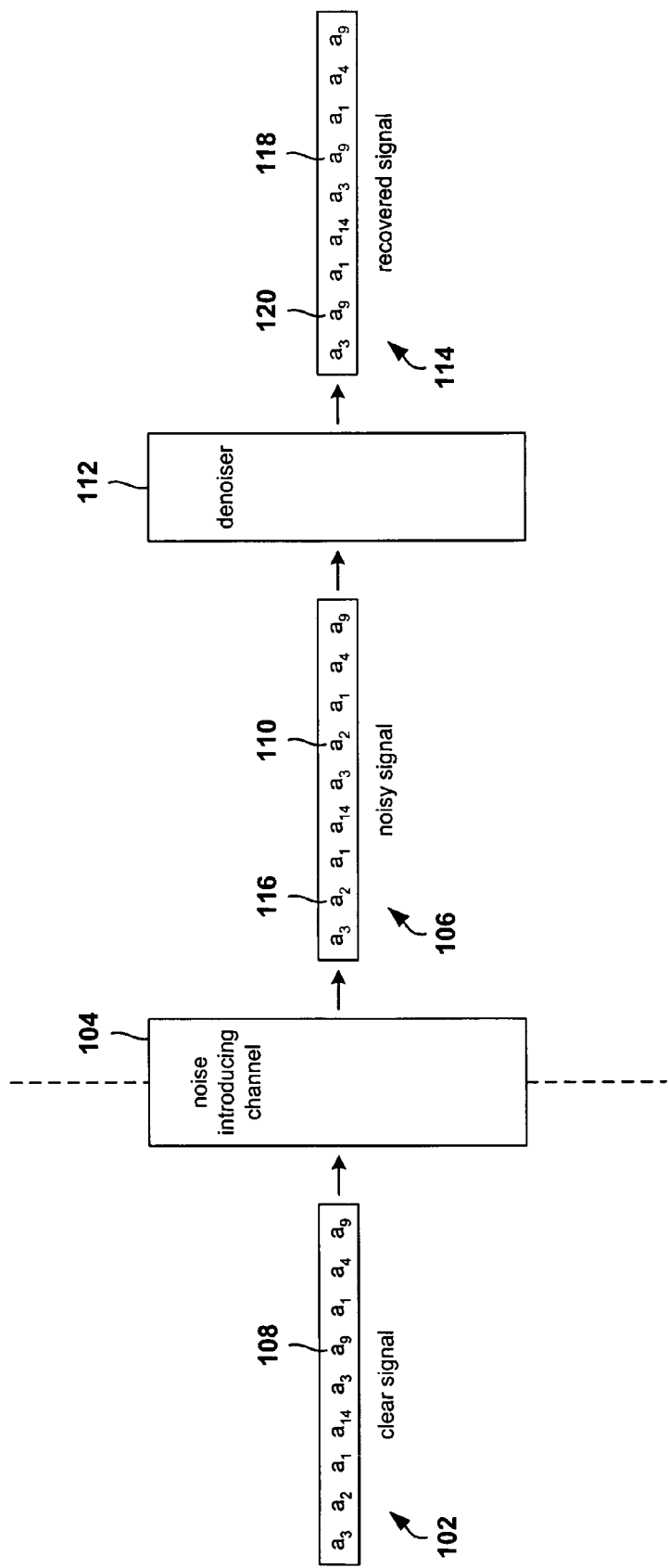
FIG. 1 illustrates introduction of noise into a clean signal to produce a noisy signal and subsequent denoising of the noisy signal to produce a recovered signal.

FIG. 1 illustrates introduction of noise into a clean signal to produce a noisy signal and subsequent denoising of the noisy signal to produce a recovered signal. In FIG. 1, signals are represented as sequences of symbols that are each members of an alphabet A having n distinct symbols, where A is:

$$A = (\alpha_1, \alpha_2, \alpha_3, \ldots \alpha_n)$$

Note that the subscripts refer to the positions of the respective symbols within an ordered listing of the different symbols of the alphabet, and not to the positions of symbols in a signal. In FIG. 1, an initial, clean signal 102 comprises an ordered sequence of nine symbols from the alphabet A. In normal circumstances, an input signal would generally have thousands, millions, or more symbols. The short input signal 102 is used for illustrative convenience.

The clean signal 102 is transmitted or passed through a noise-introducing channel 104, producing a noisy signal 106. In the example shown in FIG. 1, the output signal 106 comprises symbols from the same alphabet as the input signal 102, although, in general, the input symbols may be chosen from a different, equally sized or smaller alphabet than that from which the output symbols are selected. In the example shown in FIG. 1, the sixth symbol in the clean signal 108, "$\alpha_9$," is altered by the noise-introducing channel to produce the symbol "$\alpha_2$" 110 in the noisy signal 106. There are many different types of noise-introducing channels, each type characterized by the types and magnitudes of noise that the noise-introducing channel introduces into a clean signal. Examples of noise-introducing channels include electronic communications media, data storage devices to which information is transferred and from which information is extracted, and transmission and reception of radio and television signals. In this discussion, a signal is treated as a linear, ordered sequence of symbols, such as a stream of alphanumeric characters that comprise a text file, but the actual data into which noise is introduced by noise-introducing channels in real world situations may include two-dimensional images, audio signals, video signals, and other types of displayed and broadcast information.

In order to display, broadcast, or store a received, noisy signal with reasonable fidelity with respect to the initially transmitted clean signal, a denoising process may be undertaken to remove noise introduced into the clean signal by a noise-introducing channel. In FIG. 1, the noisy signal 106 is passed through, or processed by, a denoiser 112 to produce a recovered signal 114 which, when the denoising process is effective, is substantially closer to, or more perceptually similar to, the originally transmitted clean signal than to the received noisy signal.

Many types of denoisers have been proposed, studied, and implemented. Some involve application of continuous mathematics, some involve detailed knowledge of the statistical properties of the originally transmitted clean signal, and some rely on detailed information concerning time and sequence-dependent behavior of the noise-introducing channel. The following discussion describes a discrete denoiser, referred to as "DUDE," related to the present invention. The DUDE is discrete in the sense that the DUDE processes signals comprising discrete symbols using a discrete algorithm, rather than continuous mathematics. The DUDE is universal in that it asymptotically approaches the performance of an optimum denoiser employing knowledge of the clean-signal symbol-occurrence distributions without access to these distributions.

The DUDE implementation is motivated by a particular noise-introducing-channel model and a number of assumptions. These are discussed below. However, DUDE may effectively function when the model and assumptions do not, in fact, correspond to the particular characteristics and nature of a noise-introducing channel. Thus, the model and assumptions motivate the DUDE approach, but the DUDE has a much greater range of effectiveness and applicability than merely to denoising signals corrupted by a noise-introducing channel corresponding to the motivating model and assumptions.

As shown in FIG. 1, the DUDE 112 employs a particular strategy for denoising a noisy signal. The DUDE considers each symbol within a context generally comprising one or more symbols preceding and following the symbol according to a left to right ordering. For example, in FIG. 1, the two occurrences of the symbol "$\alpha_2$" in the noisy signal 106 occur within the same single preceding-and-following-symbol context. The full context for the two occurrences of the symbol "$\alpha_2$" in the noisy signal 106 of the example in FIG. 1 is ["$\alpha_3$," "$\alpha_1$"]. The DUDE either leaves all symbols of a particular type "$\alpha_i$" within a particular context unchanged, or changes all occurrences of a particular type of symbol "$\alpha_i$" within a particular context to a different symbol "$\alpha_j$." For example, in FIG. 1, the denoiser has replaced all occurrences of the symbol "$\alpha_2$" 110 and 112 in the noisy signal within the full context ["$\alpha_3$," "$\alpha_1$"] with the symbol "$\alpha_9$" 114 and 116 in the recovered symbol. Thus, the DUDE does not necessarily produce a recovered signal identical to the originally transmitted clean signal, but instead produces a denoised, recovered signal estimated to have less distortion with respect to the clean signal than the noisy signal. In the above example, replacement of the second symbol "$\alpha_2$" 110 with the symbol "$\alpha_9$" 114 restores the originally transmitted symbol at that position, but replacement of the first occurrence of symbol "$\alpha_2$" 112 in the noisy signal with the symbol "$\alpha_9$" 116 introduces a new distortion. The DUDE only replaces one symbol with another to produce the recovered signal when the DUDE estimates that the overall distortion of the recovered signal with respect to the clean signal will be less than the distortion of the noisy signal with respect to the clean signal.

Figure 2A:
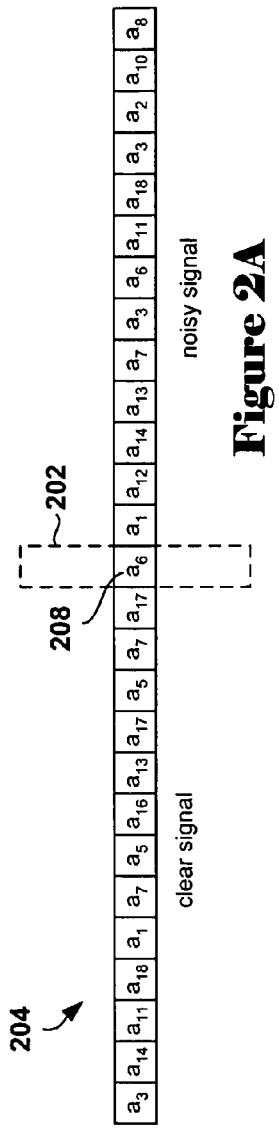

FIGS. 2A-D illustrate a motivation for DUDE related to characteristics of the noise-introducing channel. DUDE assumes a memory-less channel. In other words, as shown in FIG. 2A, the noise-introducing channel 202 may be considered to act as a one-symbol window, or aperture, through which a clean signal 204 passes. The noise-introducing channel 202 corrupts a given clean-signal symbol, replacing the given symbol with another symbol in the noisy signal, with an estimateable probability that depends neither on the history of symbols preceding the symbol through the noise-introducing channel nor on the symbols that are subsequently transmitted through the noise-introducing channel.

Figure 2B:
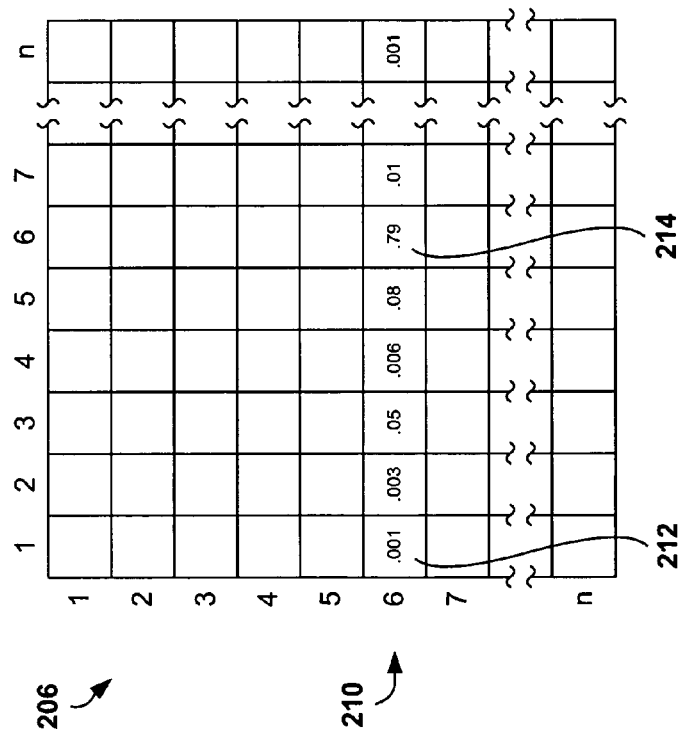

FIG. 2B shows a portion of a table 206 that stores the probabilities that any particular symbol from the alphabet A, "$\alpha_1$" may be corrupted to a symbol "$\alpha_j$" during transmission through the noise-introducing channel. For example, in FIG. 2A, the symbol "$\alpha_6$" 208 is currently passing through the noise-introducing channel. Row 210 in table 206 contains the probabilities that symbol "$\alpha_6$" will be corrupted to each of the different, possible symbols in the alphabet A. For example, the probability that the symbol "$\alpha_6$" will be changed to the symbol "$\alpha_1$" 212 appears in the first cell of row 210 in table 206, indexed by the integers "6" and "1" corresponding to the positions of symbols "$\alpha_6$" and "$\alpha_1$" in the alphabet A. The probability that symbol "$\alpha_6$" will be faithfully transferred, without corruption, through the noise-introducing channel 214 appears in the table cell with indices (6, 6), the probability of symbol "$\alpha_6$" being transmitted as the symbol "$\alpha_6$." Note that the sum of the probabilities in each row of the table 206 is 1.0, since a given symbol will be transmitted by the noise-introducing channel either faithfully or it will be corrupted to some other symbol in alphabet A. As shown in FIG. 2C, table 206 in FIG. 2B can be alternatively expressed as a two-dimensional matrix $\Pi$ 216, with the matrix element identified by indices (i, j) indicating the probability that symbol "$\alpha_i$" will be transmitted by the noise-introducing channel as symbol "$\alpha_j$." Note also that a column j in matrix $\Pi$ may be referred to as "$\pi_j$" or $\pi_{\alpha_j}$.

Figure 2D:
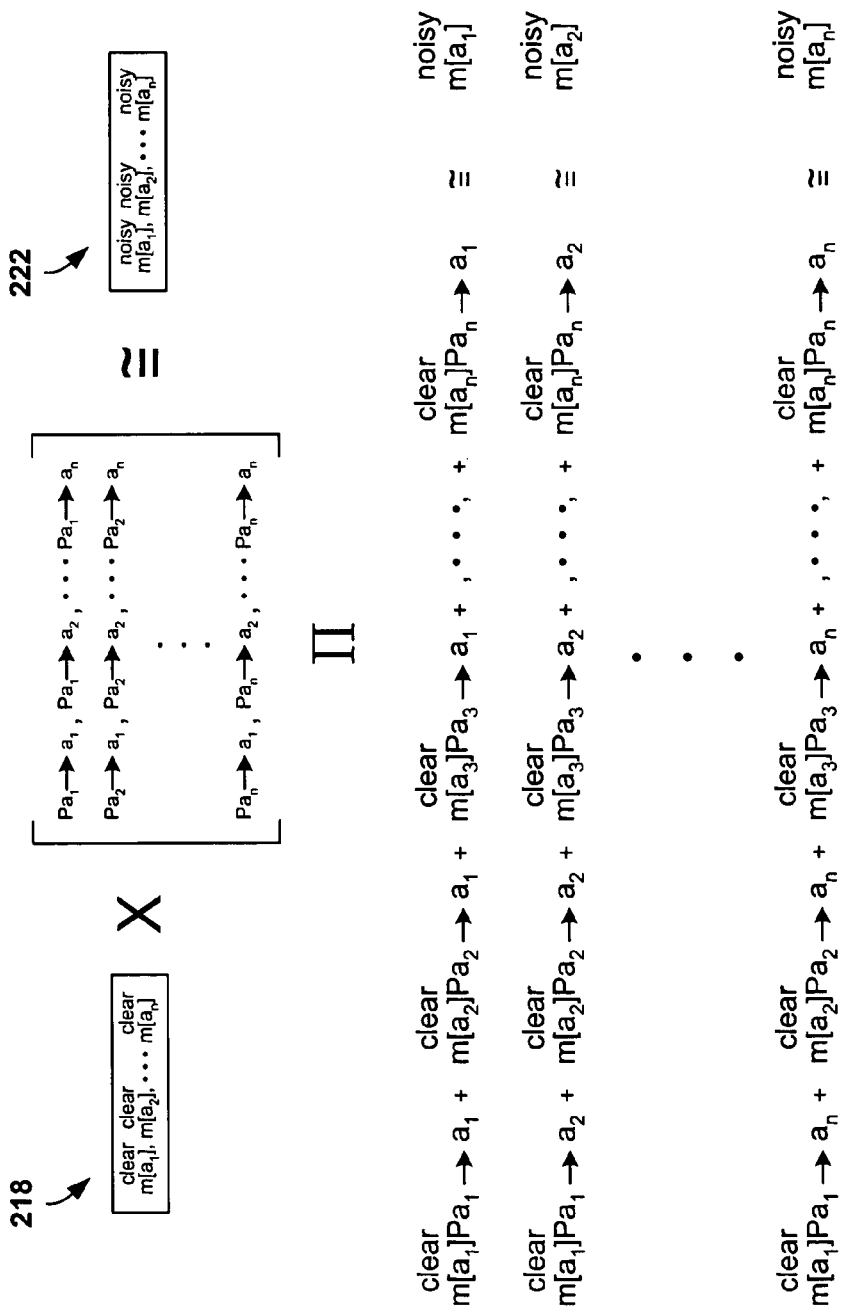

As shown in FIG. 2D, a row vector 218 containing the counts of the number of each type of symbol in the clean signal, where, for example, the number of occurrences of the symbol "$\alpha_5$" in the clean signal appears in the row vector as $m^{clean}[\alpha_5]$, can be multiplied by the symbol-transition-probability matrix $\Pi$ 220 to produce a row vector 222 containing the expected counts for each of the symbols in the noisy signal. The actual occurrence counts of symbols "$\alpha_i$" in the noisy signal appear in the row vector $m^{noisy}$. The matrix multiplication is shown in expanded form 224 below the matrix multiplication in FIG. 2D. Thus, in vector notation:

$$m^{clean}\Pi \cong m^{noisy}$$

where $m^{clean}$ is a row vector containing the occurrence counts of each symbol $\alpha_i$ in alphabet A in the clean signal; and $m^{noisy}$ is a row vector containing the occurrence counts of each symbol $\alpha_i$ in alphabet A in the noisy signal.

The approximation symbol $\cong$ is employed in the above equation, because the probabilities in the matrix $\Pi$ give only the expected frequency of a particular symbol substitution, while the actual symbol substitution effected by the noise-introducing channel is random. In other words, the noise-introducing channel behaves randomly, rather than deterministically, and thus may produce different results each time a particular clean signal is transmitted through the noise-introducing channel. The error in the approximation, obtained as the sum of the absolute values of the components of the difference between the left and right sides of the approximation, above, is generally small relative to the sequence length, on the order of the square root of the sequence length. Multiplying, from the right, both sides of the above equation by the inverse of matrix Π, assuming that Π is invertible, allows for calculation of an estimated row-vector count of the symbols in the clean signal, $\hat{m}^{clean}$, from the counts of the symbols in the noisy signal, as follows:

$$\hat{m}^{clean} = m^{noisy}\Pi^{-1}$$

In the case where the noisy symbol alphabet is larger than the clean symbol alphabet, it is assumed that Π is full-row-rank and the inverse in the above expression can be replaced by a generalized inverse, such as the Moore-Penrose generalized inverse.

As described below, the DUDE applies clean symbol count estimation on a per-context basis to obtain estimated counts of clean symbols occurring in particular noisy symbol contexts. The actual denoising of a noisy symbol is then determined from the noisy symbol's value, the resulting estimated context-dependent clean symbol counts, and a loss or distortion measure, in a manner described below.

As discussed above, the DUDE considers each symbol in a noisy signal within a context. The context may be, in a 1-dimensional signal, such as that used for the example of FIG. 1, the values of a number of symbols preceding, following, or both preceding and following a currently considered signal. In 2-dimensional or higher dimensional signals, the context may be values of symbols in any of an almost limitless number of different types of neighborhoods surrounding a particular symbol. For example, in a 2-dimensional image, the context may be the eight pixel values surrounding a particular, interior pixel. In the following discussion, a 1-dimensional signal is used for examples, but higher dimensional signals can be effectively denoised by the DUDE.

Figure 3A:
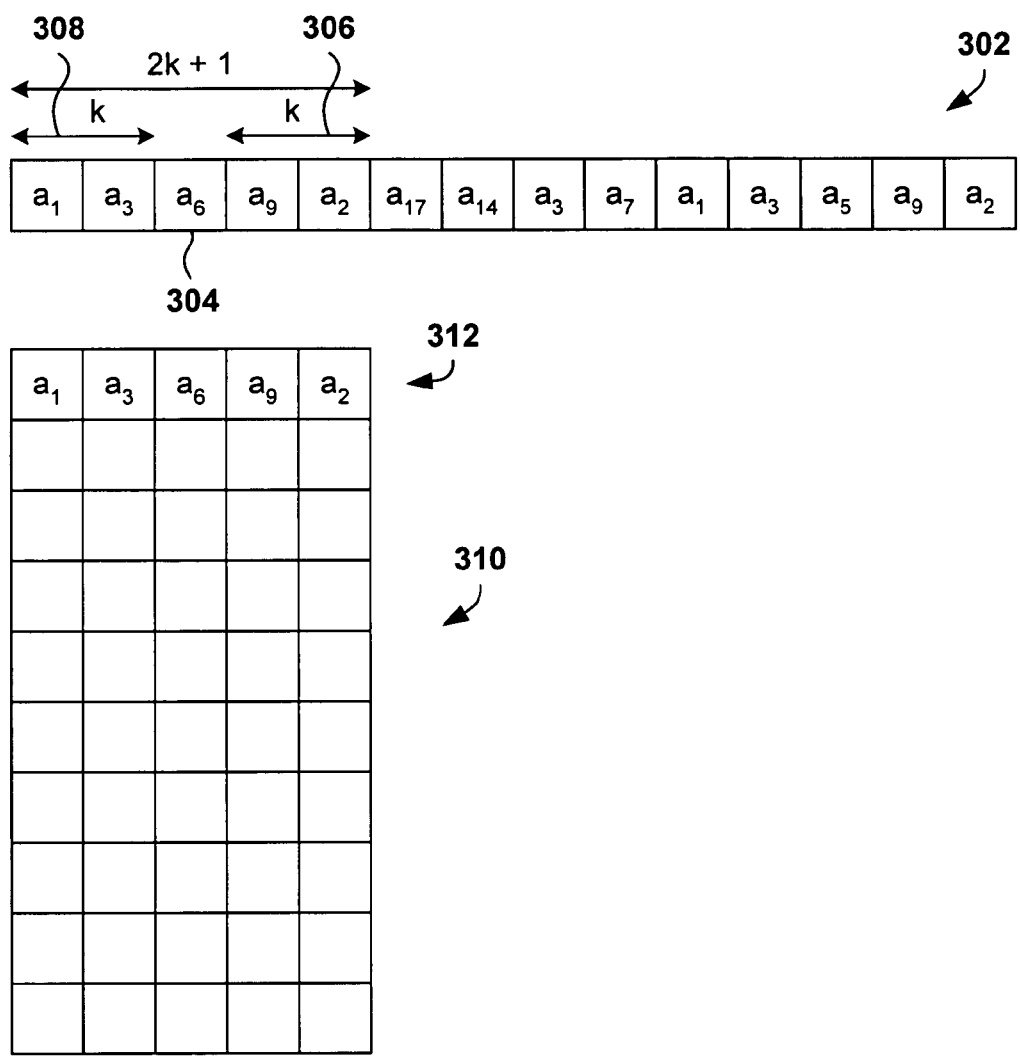
FIGS. 3A-D illustrate a context-based, sliding window approach by which a discrete denoiser characterizes the occurrences of symbols in a noisy signal.

In order to consider occurrences of symbols within contexts in the 1-dimensional-signal case, the DUDE needs to consider a number of symbols adjacent to each, considered symbol. FIGS. 3A-D illustrate a context-based, sliding window approach by which the DUDE characterizes the occurrences of symbols in a noisy signal. FIGS. 3A-D all employ the same illustration conventions, which are described only for FIG. 3A, in the interest of brevity. In FIG. 3A, a noisy signal 302 is analyzed by DUDE in order to determine the occurrence counts of particular symbols within particular contexts within the noisy signal. The DUDE employs a constant k to describe the length of a sequence of symbols preceding, and the length of a sequence of symbols subsequent to, a particular symbol that, together with the particular symbol, may be viewed as a metasymbol of length 2k+1. In the example of FIGS. 3A-D, k has the value "2." Thus, a symbol preceded by a pair of symbols and succeeded by a pair of symbols can be viewed as a five-symbol metasymbol. In FIG. 3A, the symbol "$\alpha_6$" 304 occurs within a context of the succeeding k-length symbol string "$\alpha_9\alpha_2$" 306 and is preceded by the two-symbol string "$\alpha_1\alpha_3$" 308. The symbol "$\alpha_6$" therefore occurs at least once in the noisy signal within the context ["$\alpha_1\alpha_3$," "$\alpha_9\alpha_2$"], or, in other words, the metasymbol "$\alpha_1\alpha_3\alpha_6\alpha_9\alpha_2$" occurs at least once in the noisy signal. The occurrence of this metasymbol within the noisy signal 302 is listed within a table 310 as the first five-symbol metacharacter 312.

Figure 3B:
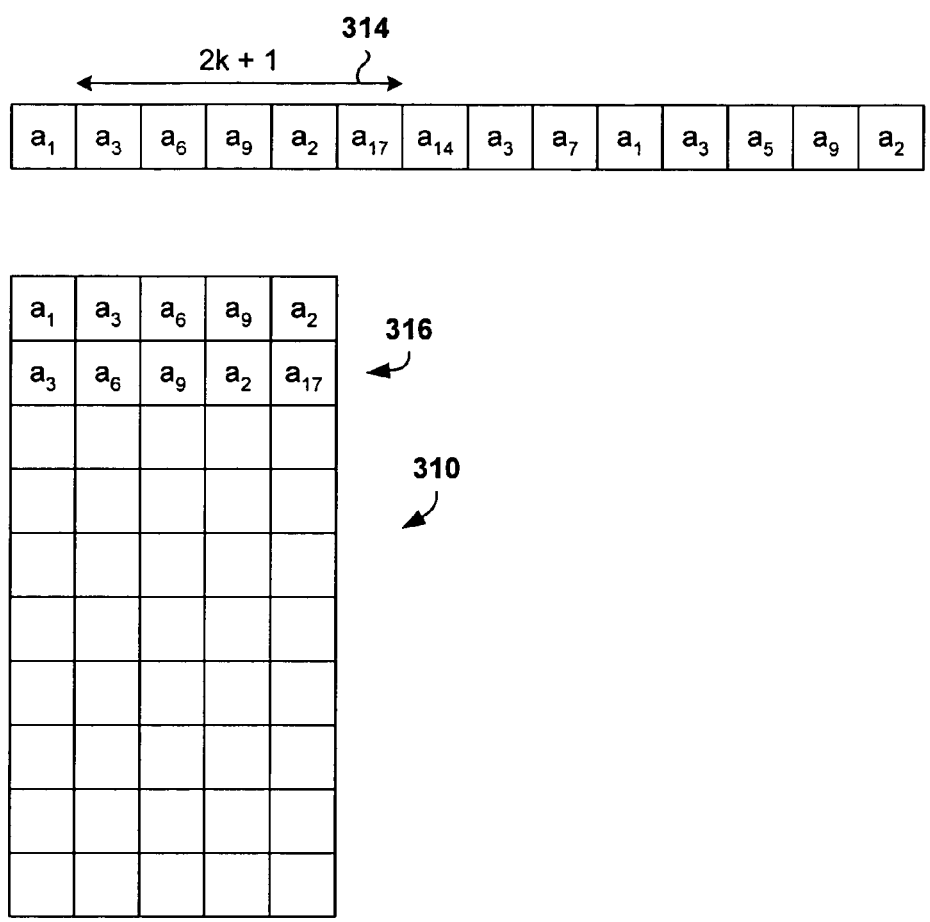
Figure 3C:
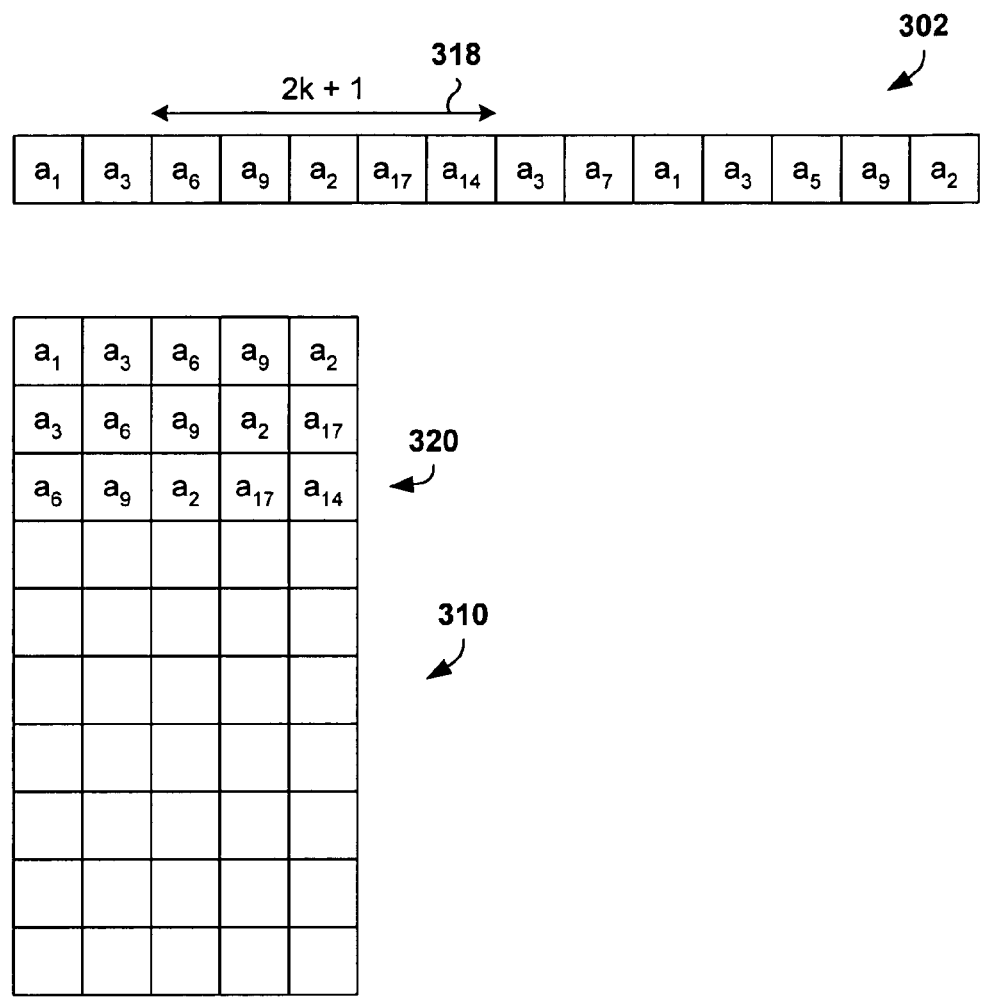
Figure 3D:
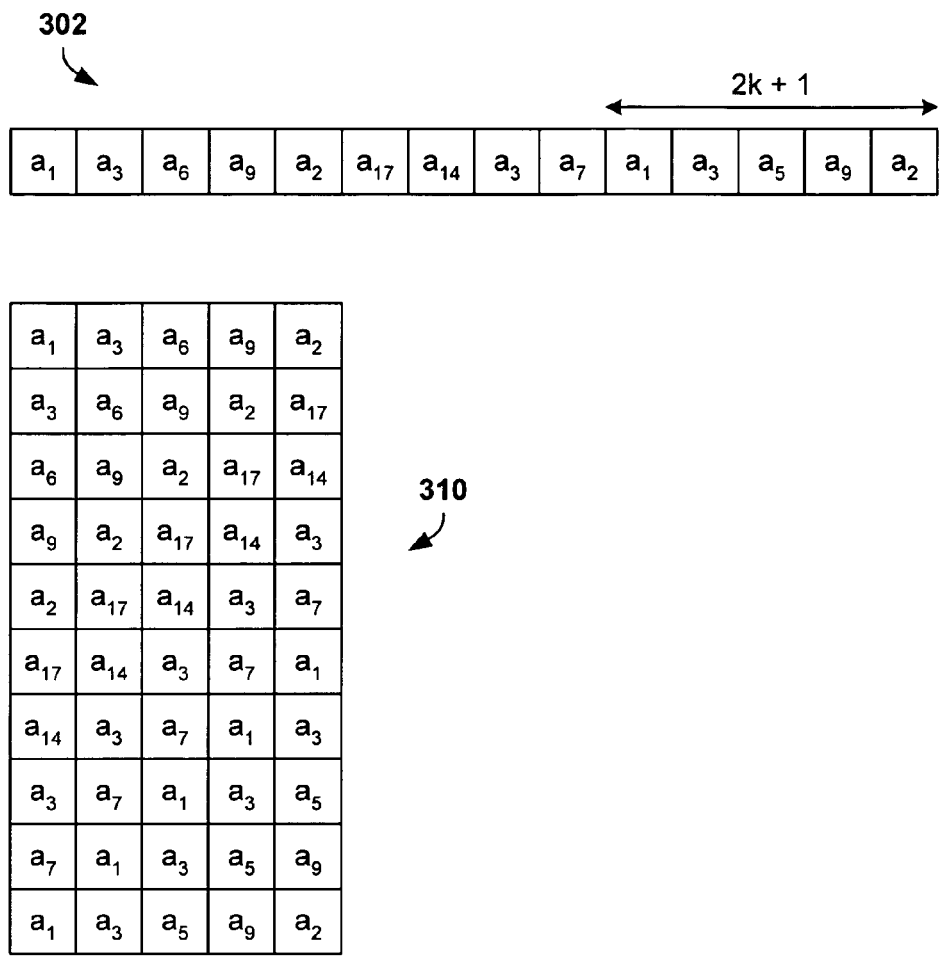

As shown in FIG. 3B, DUDE then slides the window of length 2k+1 rightward, by one symbol, to consider a second metasymbol 314 of length 2k+1. In this second metasymbol, the symbol "$\alpha_9$" appears within the context ["$\alpha_3\alpha_6$," "$\alpha_2\alpha_{17}$"]. This second metasymbol is entered into table 310 as the second entry 316. FIG. 3C shows detection of a third metasymbol 318 in the noisy signal 302 and entry of the third metasymbol into table 310 as entry 320. FIG. 3D shows the table 310 following complete analysis of the short noisy signal 302 by DUDE. Although, in the examples shown in FIG. 3-D, DUDE lists each metasymbol as a separate entry in the table, in a more efficient implementation, DUDE enters each detected metasymbol only once in an index table, and increments an occurrence count each time the metasymbol is subsequently detected. In this fashion, in a first pass, DUDE tabulates the frequency of occurrence of metasymbols within the noisy signal or, viewed differently, DUDE tabulates the occurrence frequency of symbols within contexts comprising k preceding and k subsequent symbols surrounding each symbol.

Figure 4:
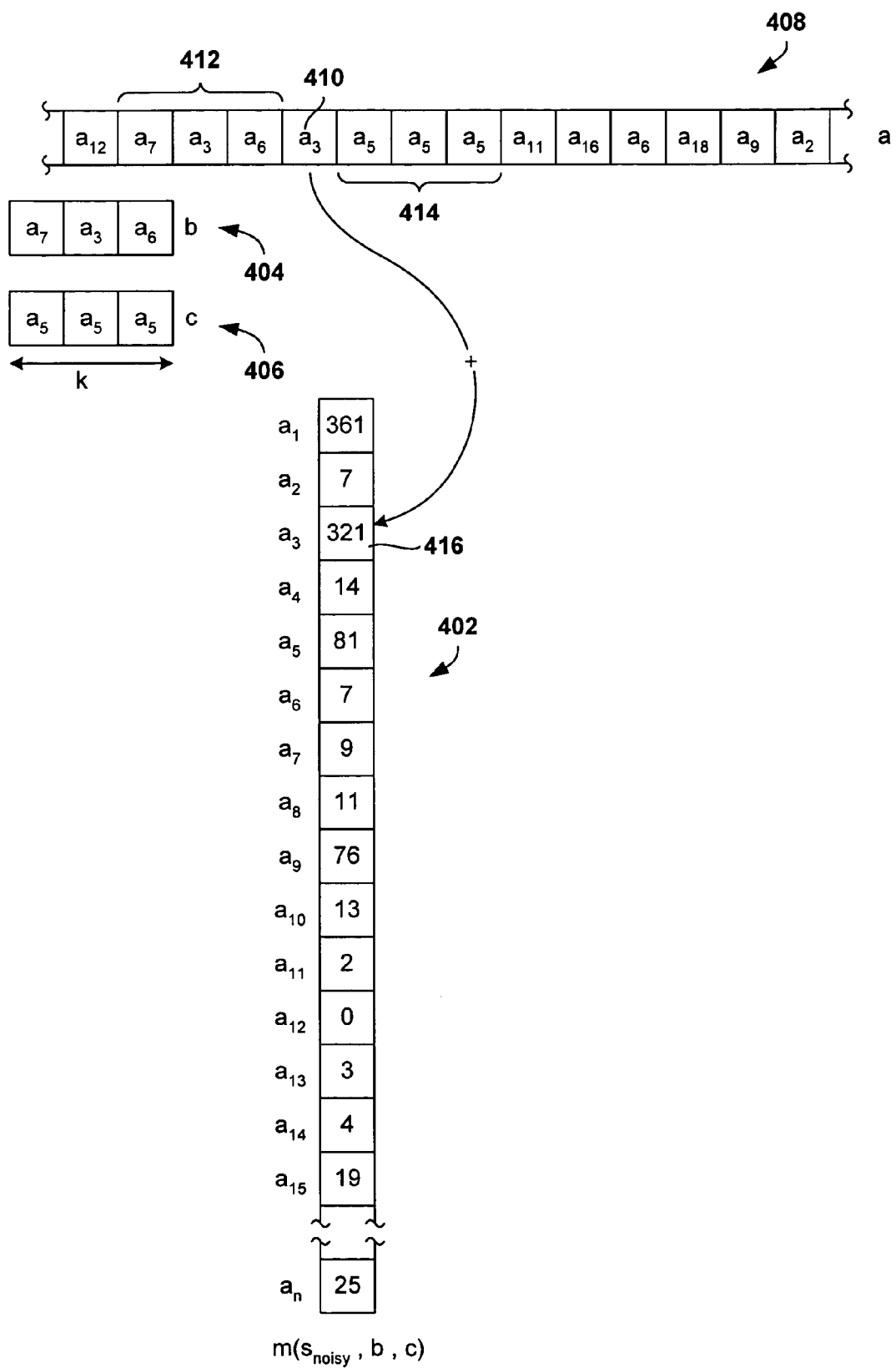
FIG. 4 illustrates a convenient mathematical notation and data structure representing a portion of the metasymbol table constructed by a discrete denoiser, as described with reference to FIGS. 3A-D.

FIG. 4 illustrates a convenient mathematical notation and data structure representing a portion of the metasymbol table constructed by DUDE, as described with reference to FIGS. 3A-D. The column vector m($s_{noisy}$,b,c) 402 represents a count of the occurrences of each symbol in the alphabet A within a particular context, represented by the k-length symbol vectors b and c, within the noisy signal $s_{noisy}$, where the noisy signal is viewed as a vector. In FIG. 4, for example, the context value for which the occurrence counts are tabulated in column vector m($s_{noisy}$,b,c) comprises the symbol vector 404 and the symbol vector 406, where k has the value 3. In the noisy signal $s_{noisy}$ 408, the symbol "$\alpha_3$" 410 occurs within the context comprising three symbols 412 to the left of the symbol "$\alpha_3$" 410 and three symbols 414 to the right of the symbol "$\alpha_3$". This particular context has a value equal to the combined values of symbol vectors 404 and 406, denoted ["$\alpha_7\alpha_3\alpha_6$," "$\alpha_5\alpha_5\alpha_5$"] and this occurrence of the symbol "$\alpha_3$" 410 within the context ["$\alpha_7\alpha_3\alpha_6$," "$\alpha_5\alpha_5\alpha_5$"], along with all other occurrences of the symbol "$\alpha_3$" in the context ["$\alpha_7\alpha_3\alpha_6$," "$\alpha_5\alpha_5\alpha_5$"], is noted by a count 416 within the column vector m($s_{noisy}$,b,c), with [b,c]=["$\alpha_7\alpha_3\alpha_6$," "$\alpha_5\alpha_5\alpha_5$"]. In other words, a symbol "$\alpha_3$" occurs within the context ["$\alpha_7\alpha_3\alpha_6$," "$\alpha_5\alpha_5\alpha_5$"] in the noisy signal $s_{noisy}$ 321 times. The counts for the occurrences of all other symbols "$\alpha_1$", "$\alpha_2$", and "$\alpha_4$"–"$\alpha_n$" in the context ["$\alpha_7\alpha_3\alpha_6$," "$\alpha_5\alpha_5\alpha_5$"] within noisy signal $s_{noisy}$ are recorded in successive elements of the column vector m($s_{noisy}$, "$\alpha_7\alpha_3\alpha_6$", "$\alpha_5\alpha_5\alpha_5$"). An individual count within a column vector m($s_{noisy}$,b,c) can be referred to using an array-like notation. For example, the count of the number of times that the symbol "$\alpha_3$" appears in the context ["$\alpha_7\alpha_3\alpha_6$," "$\alpha_5\alpha_5\alpha_5$"] within the noisy signal $s_{noisy}$, 321, can be referred to as m($s_{noisy}$, "$\alpha_7\alpha_3\alpha_6$", "$\alpha_5\alpha_5\alpha_5$")[$\alpha_3$].

DUDE employs either a full or a partial set of column vectors for all detected contexts of a fixed length 2k in the noisy signal in order to denoise the noisy signal. Note that an initial set of symbols at the beginning and end of the noisy signal of length k are not counted in any column vector m($s_{noisy}$,b,c) because they lack either sufficient preceding or subsequent symbols to form a metasymbol of length 2k+1. However, as the length of the noisy signal for practical problems tends to be quite large, and the context length k tends to be relatively small, DUDE's failure to consider the first and final k symbols with respect to their occurrence within contexts makes almost no practical difference in the outcome of the denoising operation.

Figures 5A, 5B:
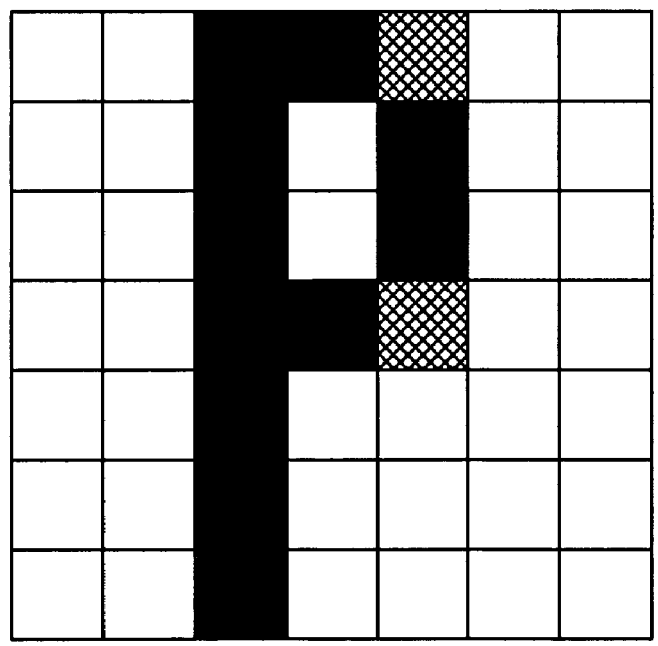
FIGS. 5A-D illustrate the concept of symbol-corruption-related distortion in a noisy or recovered signal.

FIGS. 5A-D illustrate the concept of symbol-corruption-related distortion in a noisy or recovered signal. The example of FIGS. 5A-D relates to a 256-value gray scale image of a letter. In FIG. 5A, the gray-scale values for cells, or pixels, within a two-dimensional image 502 are shown, with the character portions of the symbol generally having a maximum gray-scale value of 255 and the background pixels having a minimum gray-scale value of zero, using a convention that the displayed darkness of the pixel increases with increasing numerical value. Visual display of the image represented by the two-dimensional gray-scale signal in FIG. 5A is shown in FIG. 5B 504. The gray-scale data in FIG. 5A is meant to represent a low resolution image of the letter "P." As shown in FIG. 5B, the image of the letter "P" is reasonably distinct, with reasonably high contrast.

Figures 5C, 5D:
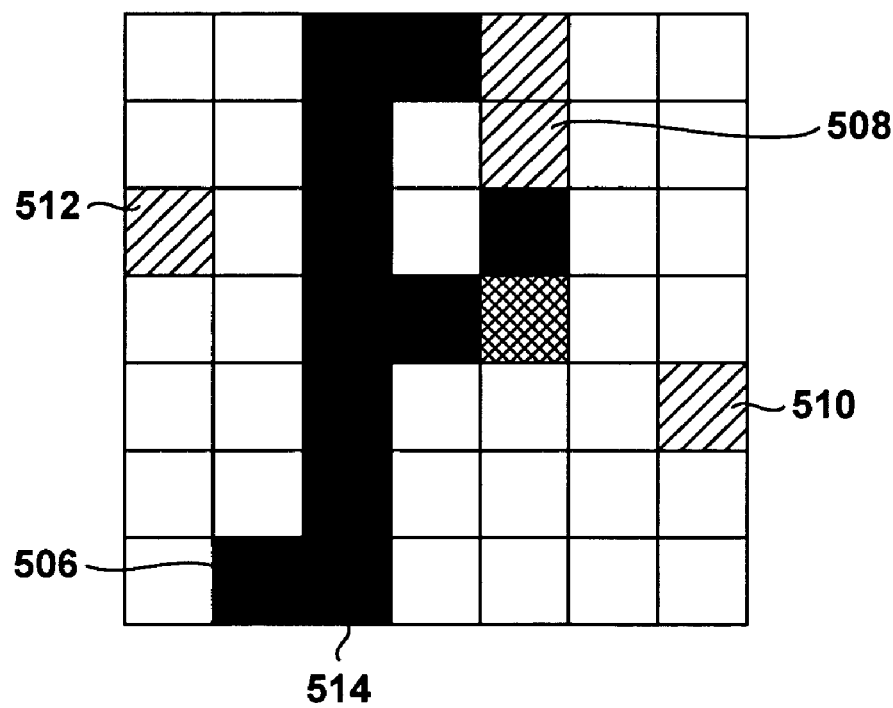

FIG. 5C shows the gray-scale data with noise introduced by transmission through a hypothetical noise-introducing channel. Comparison of FIG. 5C to FIG. 5A shows that there is marked difference between the gray-scale values of certain cells, such as cell 506, prior to, and after, transmission. FIG. 5D shows a display of the gray-scale data shown in FIG. 5C. The displayed image is no longer recognizable as the letter "P." In particular, two cells contribute greatly to the distortion of the figure: (1) cell 506, changed in transmission from the gray-scale value "0" to the gray-scale value "223"; and (2) cell 508, changed in transmission from the gray-scale value "255" to the gray-scale value "10." Other noise, such as the relatively small magnitude gray-scale changes of cells 510 and 512, introduce relatively little distortion, and, by themselves, would have not seriously impacted recognition of the letter "P." In this case, the distortion of the displayed image contributed by noise introduced into the gray-scale data appears to be proportional to the magnitude of change in the gray-scale value. Thus, the distorting effects of noise within symbols of a signal are not necessarily uniform. A noise-induced change of a transmitted symbol to a closely related, received symbol may produce far less distortion than a noise-induced change of a transmitted symbol to a very different, received symbol.

The DUDE models the non-uniform distortion effects of particular symbol transitions induced by noise with a matrix $\Lambda$. FIG. 6 displays one form of the symbol-transformation distortion matrix $\Lambda$. An element $d_{\alpha_i \to \alpha_j}$ of the matrix $\Lambda$ provides the relative distortion incurred by substituting the symbol "$\alpha_j$" in the noisy or recovered signal for the symbol "$\alpha_i$" in the clean signal. An individual column j of the matrix $\Lambda$ may be referred to as $\lambda_j$ or $\lambda_{\alpha_j}$.

FIG. 7 illustrates computation of the relative distortion, with respect to the clean signal, expected from replacing a symbol "$\alpha_\alpha$" in a received, noisy signal by the symbol "$\alpha_x$." As shown in FIG. 7, element-by-element multiplication of the elements of the column vectors $\lambda_{\alpha_x}$ and $\pi_{\alpha_\alpha}$, an operation known as the Schur product of two vectors, and designated in the current discussion by the symbol $\square$, produces the column vector $\lambda_{\alpha_x} \square \pi_{\alpha_\alpha}$ in which the i-th element is the product of a distortion and probability, $d_{\alpha_i \to \alpha_x} p_{\alpha_i \to \alpha_\alpha}$, reflective of the relative distortion expected in the recovered signal by replacing the symbol $\alpha_\alpha$ in the noisy symbol by the symbol "$\alpha_x$" when the symbol in the originally transmitted, clean signal is "$\alpha_i$."

FIG. 8 illustrates use of the column vector $\lambda_{\alpha_x} \square \pi_{\alpha_\alpha}$ to compute a distortion expected for replacing "$\alpha_\alpha$" in the metasymbol $b\alpha_\alpha c$ in a noisy signal $s_{noisy}$ by the replacement symbol "$\alpha_x$." In the following expression, and in subsequent expressions, the vectors $s_{noisy}$ and $s_{clean}$ denote noisy and clean signals, respectively. A different column vector q can be defined to represent the occurrence counts for all symbols in the clean signal that appear at locations in the clean signal that correspond to locations in the noisy signal around which a particular context [b, c] occurs. An element of the column vector q is defined as:

$$q(s_{noisy}, s_{clean}, b, c)[\alpha_\alpha] = |\{i : s_{clean}[i] = \alpha_\alpha, (s_{noisy}[i-k], s_{noisy}[i-k+1], \ldots, s_{noisy}[i-1]) = b, (s_{noisy}[i+1], s_{noisy}[i+2], \ldots, s_{noisy}[i+k]) = c\}|,$$

where $s_{clean}[i]$ and $s_{noisy}[i]$ denote the symbols at location i in the clean and noisy signals, respectively; and $\alpha_\alpha$ is a symbol in the alphabet A.

The column vector $q(s_{noisy}, s_{clean}, b, c)$ includes n elements with indices $\alpha_\alpha$ from "$\alpha_1$" to "$\alpha_n$," where n is the size of the symbol alphabet A. Note that the column vector $q(s_{noisy}, s_{clean}, b, c)$ is, in general, not obtainable, because the clean signal, upon which the definition depends, is unavailable. Multiplication of the transpose of the column vector $q(s_{noisy}, s_{clean}, b, c)$, $q^T(s_{noisy}, s_{clean}, b, c)$, by the column vector $\lambda_{\alpha_x} \square \pi_{\alpha_\alpha}$ produces the sum of the expected distortions in the column vector times the occurrence counts in the row vector that together provide a total expected distortion for replacing "$\alpha_\alpha$" in the metasymbol $b\alpha_\alpha c$ in $s_{noisy}$ by "$\alpha_x$". For example, the first term in the sum is produced by multiplication of the first elements in the row vector by the first element in the column vector, resulting in the first term in the sum being equal to $q^T(s_{noisy}, s_{clean}, b, c)[\alpha_1](p_{\alpha_1 \to \alpha_\alpha} d_{\alpha_1 \to \alpha_x})$ or, in other words, a contribution to the total distortion expected for replacing "$\alpha_\alpha$" by "$\alpha_x$" in all occurrences of $b\alpha_\alpha c$ in $s_{noisy}$ when the corresponding symbol in $s_{clean}$ is $\alpha_1$. The full sum gives the full expected distortion:

$$q^T(s_{noisy}, s_{clean}, b, c)[a_1](p_{a_1 \to a_\alpha} d_{a_1 \to a_x}) +$$
$$q^T(s_{noisy}, s_{clean}, b, c)[a_2](p_{a_2 \to a_\alpha} d_{a_2 \to a_x}) +$$
$$q^T(s_{noisy}, s_{clean}, b, c)[a_3](p_{a_3 \to a_\alpha} d_{a_3 \to a_x}) +$$
$$\vdots$$
$$q^T(s_{noisy}, s_{clean}, b, c)[a_n](p_{a_n \to a_\alpha} d_{a_n \to a_x})$$

As discussed above, DUDE does not have the advantage of knowing the particular clean signal, transmitted through the noise-introducing channel that produced the received noisy signal. Therefore, DUDE estimates the occurrence counts, $q^T(s_{noisy}, s_{clean}, b, c)$, of symbols in the originally transmitted, clean signal, by multiplying the row vector $m^T(s_{noisy}, b, c)$ by $\Pi^{-1}$ from the right. FIG. 9 shows estimation of the counts of the occurrences of symbols "$\alpha_1$"–"$\alpha_n$" for the clean signal.

The resulting expression $$m^T(s_{noisy}, b, c) \Pi^{-1} (\lambda_{\alpha_x} \square \pi_{\alpha_\alpha})$$

obtained by substituting $m^T(s_{noisy}, b, c) \Pi^{-1}$ for $q^T(s_{noisy}, s_{clean}, b, c)$ represents DUDE's estimation of the distortion, with respect to the originally transmitted clean signal, produced by substituting "$\alpha_x$" for the symbol "$\alpha_\alpha$" within the context [b, c] in the noisy signal $s_{noisy}$. DUDE denoises the noisy signal by replacing "$\alpha_\alpha$" in each occurrence of the metasymbol $b\alpha_\alpha c$ by that symbol "$\alpha_x$" providing the least estimated distortion of the recovered signal with respect to the originally transmitted, clean signal, using the above expression. In other words, for each metasymbol $b\alpha_\alpha c$, DUDE employs the following transfer function to determine how to replace the central symbol $\alpha_\alpha$:

$$g_a^k(b, a_\alpha, c) = \frac{\text{argmin}}{a_x = a_1 \text{ to } a_n} [m^T(s_{noisy}, b, c)\Pi^{-1}(\lambda_{a_x} \Box \pi_{a_\alpha})]$$

In some cases, the minimum distortion is produced by no substitution or, in other words, by the substitution $\alpha_x$ equal to $\alpha_\alpha$.

Figure 10:
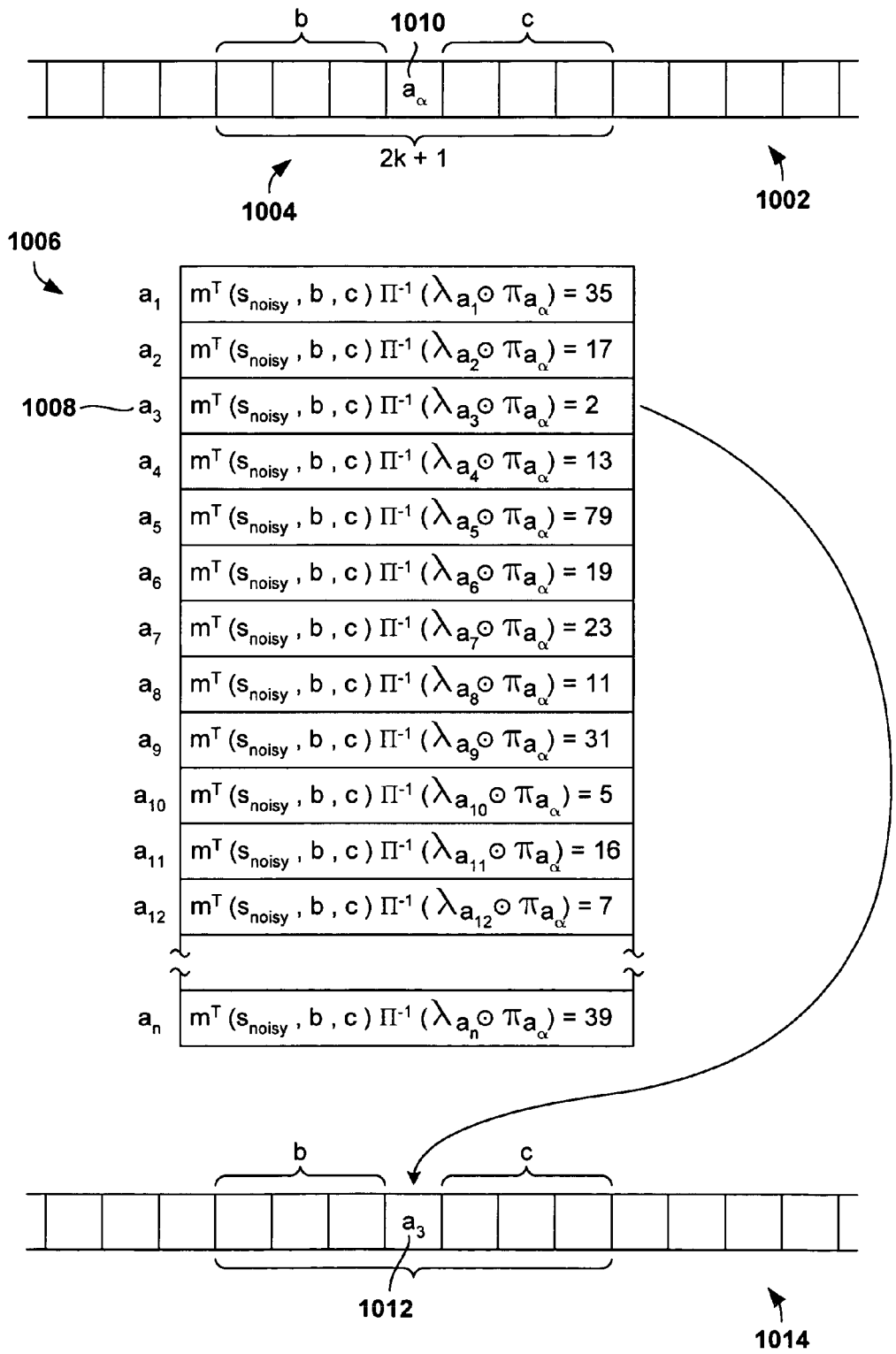
FIG. 10 illustrates the process by which a discrete denoiser denoises a noisy, received signal.

FIG. 10 illustrates the process by which DUDE denoises a noisy, received signal. First, as discussed above, DUDE compiles counts for all or a portion of the possible metasymbols comprising each possible symbol "$\alpha_i$" within each possible context [b, c]. As discussed above, the counts are stored in column vectors $m(s_{noisy}, b, c)$. In the next pass, DUDE again passes a sliding window over the noisy signal 1002. For each metasymbol, such as metasymbol 1004, DUDE determines the relative distortions of the recovered signal with respect to the clean signal that would be produced by substituting for the central character of the metasymbol "$\alpha_\alpha$" each possible replacement symbol "$\alpha_i$" in the range i=1 to n. These relative distortions are shown in table 1006 in FIG. 10 for the metasymbol 1004 detected in the noisy signal 1002. Examining the relative distortion table 1006, DUDE selects the replacement symbol with the lowest relative distortion, or, in the case that two or more symbols produce the same relative distortions, selects the first of the multiple replacement symbols with the lowest estimated distortion. In the example shown in FIG. 10, that symbol is "$\alpha_3$" 1008. DUDE then replaces the central symbol "$\alpha_\alpha$" 1010 in the noisy signal with the selected replacement symbol "$\alpha_3$" 1012 in the recovered signal 1014. Note that the recovered signal is generated from independent considerations of each type of metasymbol in the noisy signal, so that the replacement symbol selected in a previous step does not affect the choice for a replacement symbol in a next step for a different metasymbol. In other words, the replacement signal is generated in parallel, rather than substitution of symbols directly into the noisy signal. As with any general method, the above-described method by which DUDE denoises a noisy signal can be implemented using various data structures, indexing techniques, and algorithms to produce a denoising method that has both linear time and linear working-data-set complexities or, in other words, the time complexity is related to the length of the received, noisy signal, by multiplication by a constant, as is the working-data-set complexity.

The examples employed in the above discussion of DUDE are primarily 1-dimensional signals. However, as also discussed above, 2-dimensional and multi-dimensional signals may also be denoised by DUDE. In the 2-and-multi-dimensional cases, rather than considering symbols within a 1-dimensional context, symbols may be considered within a contextual neighborhood. The pixels adjacent to a currently considered pixel in a 2-dimensional image may together comprise the contextual neighborhood for the currently considered symbol, or, equivalently, the values of a currently considered pixel and adjacent pixels may together comprise a 2-dimensional metasymbol. In a more general treatment, the expression $m^T(s_{noisy}, b, c)\Pi^{-1}(\lambda_{\alpha_x} \Box \pi_{\alpha_\alpha})$ may be replaced by the more general expression:

$$m^T(s_{noisy}, \eta)\Pi^{-1}(\lambda_{\alpha_x} \Box \pi_{\alpha_\alpha})$$

where $\eta$ denotes the values of a particular contextual neighborhood of symbols. The neighborhood may be arbitrarily defined according to various criteria, including proximity in time, proximity in display or representation, or according to any arbitrary, computable metric, and may have various different types of symmetry. For example, in the above-discussed 1-dimensional-signal examples, symmetric contexts comprising an equal number of symbols k preceding and following a currently considered symbol compose the neighborhood for the currently considered symbol, but, in other cases, a different number of preceding and following symbols may be used for the context, or symbols either only preceding or following a current considered symbol may be used.

Lossless Compression

Figure 11A:
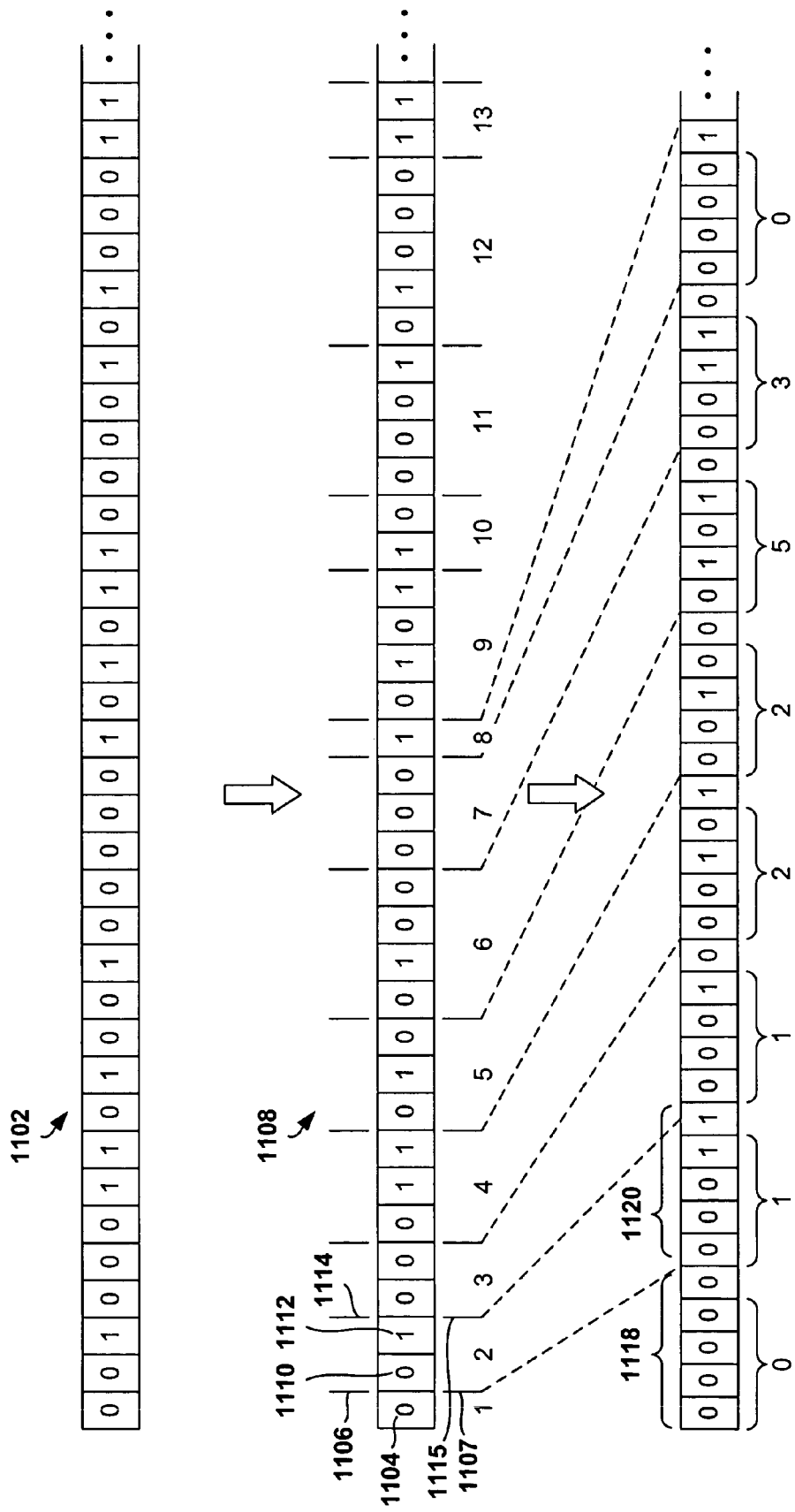

Lossless compression involves compressing data or a signal stream in a way that allows the original data or signal stream to be exactly restored, without distortion, upon decompression. One popular lossless data compression technique is known as the "Lempel-Ziv" compression technique. The Lempel-Ziv technique is most usually described using a simple example. FIGS. 11A-B illustrate Lempel-Ziv lossless data compression. In FIG. 11A, an initial, binary data signal 1102 is first shown. In a first step, the binary data signal is parsed, from left to right, to detect and tabulate each as-yet-not-tabulated substring. For example, the first "0" symbol 1104 constitutes, by itself, a first, as-yet-not-tabulated substring. Two vertical lines 1106-1107 are placed above and below, respectively, the parsed data signal 1108 to indicate the first tabulated substring boundary. Then, parsing of the next as-yet-not-tabulated substring is undertaken. The first symbol, "0" 1110, comprises a substring of length 1, but this substring has already been recognized and tabulated. Therefore, parsing continues with the next symbol "1" 1112. The "0" 1110 and "1" 1112 together constitute an as-yet-not-tabulated substring "01," and so vertical lines 1114 and 1115 are placed above and below the parsed data signal 1108 to indicate the second tabulated substring boundary. The parsing continues in a left-to-right fashion, resulting in the 13 as-yet-not-tabulated substrings with corresponding substring indices 1-13. In a second step, an encoded data signal 1116 is created by replacing each parsed, tabulated substring in the parsed data signal 1108 with a substring-index/symbol pair. Each substring-index/symbol pair, in the example in FIG. 11A, includes 5 bits that include a first, 4-bit index and a second 1-bit symbol. Because each as-yet-not-tabulated substring comprises an already-tabulated-substring prefix and a single, final binary symbol that confers as-yet-not-tabulated status to the substring, each parsed substring can be represented as the index of the already-tabulated-substring prefix followed by the binary symbol that confers as-yet-not-tabulated status to the substring. For example, the first parsed substring "0" 1104 in the parsed data signal 1108 is represented by the substring-index/symbol pair including index 0 (0000 in binary notation) indicating no prefix, and the single binary symbol "0" 1118 in the encoded data signal 1116. Similarly, the next parsed substring comprising symbols "0" 1110 and "1" 1112 is represented by the substring-index/symbol pair 1120 including index 1 (0001 in binary notation) and the binary symbol "1." In this simple embodiment of the Lempel-Ziv method, the number of bits used to represent the index of the already-tabulated-substring prefix is no smaller than the logarithm to the base 2 of the number of parsed substrings in the entire data sequence. This allows each parsed substring to have a unique index.

Implementations of the Lempel-Ziv technique normally construct a codebook, as shown in FIG. 11B, containing already-tabulated-substring/substring-index-symbol pair entries. In the example in FIGS. 11A-B, a fixed index length is employed, but in more sophisticated approaches, variable-length index fields within codewords are employed. Decoding of an encoded data string is carried out in reverse fashion, along with construction of the codebook. In the Example shown in FIG. 11A, the encoded data signal 1116 is initially longer than the original data signal 1102, but, as encoding progresses, longer and longer substrings are parsed and encoded, generally leading to compression ratios (ratio of compressed size to uncompressed size) less than one and on many types of data, such as English text, substantially less than one.

Methods that Optimize a Denoiser using Compression

The DUDE, described above, employs a number of potentially tunable parameters, including, for example, the sizes and shapes of contexts. As with many software methods, the DUDE may work most efficiently when these parameters are tuned. Embodiments of the present invention are motivated by the observation that, in general, the output of a denoiser, referred to above as a recovered signal, is optimal or, in other words, is least distorted with respect to the originally transmitted, clear signal, when the recovered signal is most compressible by a compression technique such as the lossless compression technique described in a previous subsection. The noise introduced into a clear signal by transmission through a noise-introducing channel is generally a high entropy signal superimposed on the original clear signal. Compression techniques are most effective or, in other words, provide the highest rates of compression, or lowest compression ratios, when the compression techniques are applied to low entropy signals. Therefore, the compressibility of the output of a denoiser tracks the effectiveness of the denoiser in removing noise introduced by transmission of a clear signal through a noise-introducing channel. Of course, when the clear signal is accessible, a denoiser may be straightforwardly tuned and optimized by directly comparing the recovered signal to the clear signal. However, in many practical applications, including electronic communications and data transfer applications, the clear signal is not available for denoiser tuning, and indirect techniques and metrics need to be employed in order to tune the denoiser.

Although a number of embodiments of the present invention employ a compression method to estimate the entropy of a denoised signal as a measure of denoising effectiveness, other types of entropy estimators may be employed in order to determine the decrease in entropy provided by the denoiser. In addition, when a compression method is used to estimate the decrease in entropy, a compression method is generally chosen that is suitable for the particular signal, such as PPM compression for text and JPEG compression for images.

Figure 12:
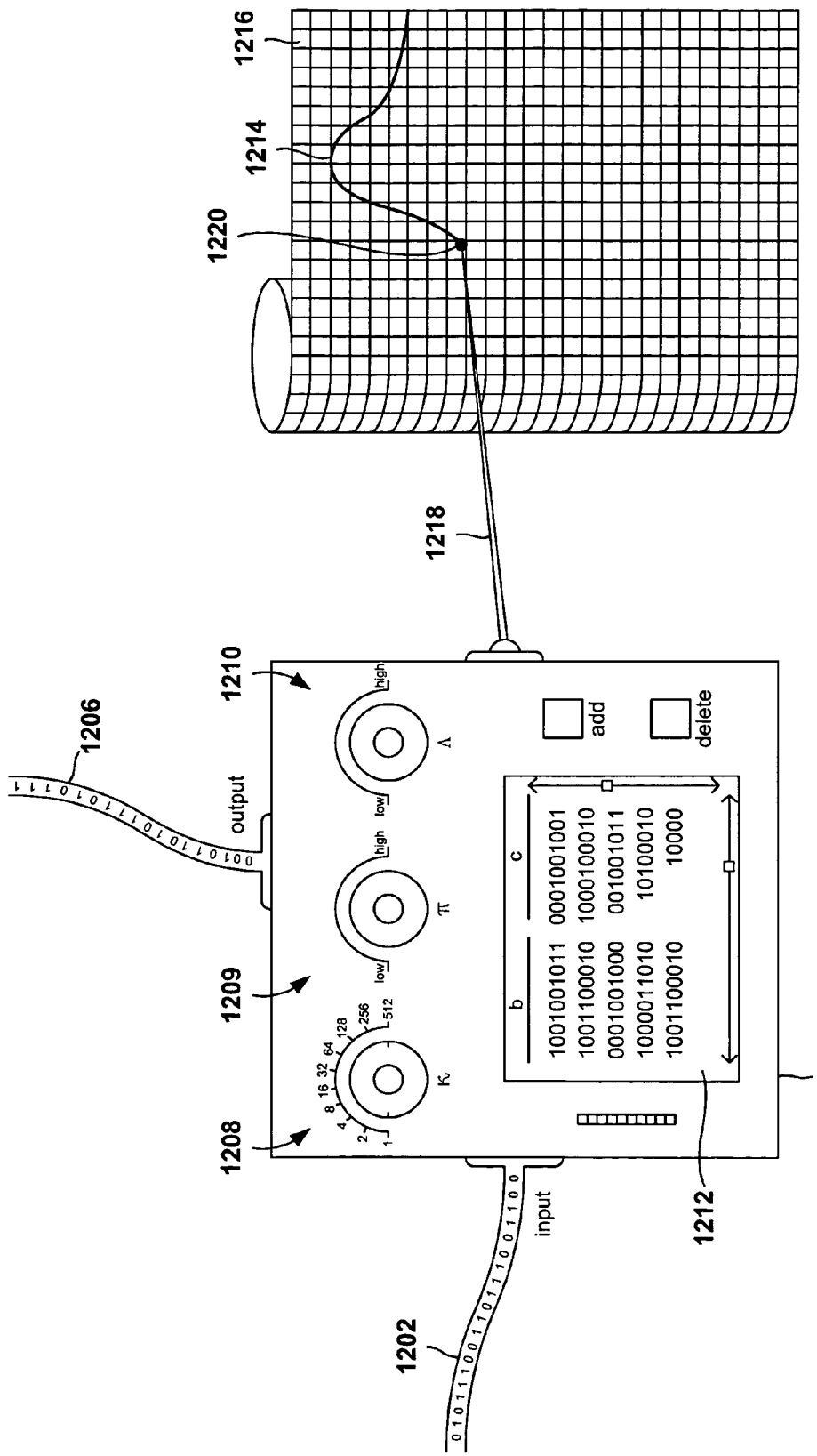
FIG. 12 illustrates an imaginary, machine-like embodiment that illustrates the overall motivation and conception of various embodiments of the present invention.

FIG. 12 illustrates an imaginary, machine-like embodiment that illustrates the overall motivation and conception of various embodiments of the present invention. In FIG. 12, a noisy signal is input 1202 to a denoiser device 1204 that outputs a denoised signal 1206. An operator of the denoiser machine 1204 adjusts various denoiser parameters using various control knobs 1208-1210 and a control panel 1212 in order to adjust the output signal 1214, related to the compressibility of the denoised signal 1206, that is written onto a continuously scrolling graph 1216 by a mechanical arm 1218, deflected by the magnitude of the compressibility signal, to which a pen 1220 is attached. The knobs and tuning parameters of the denoiser 1204 are adjusted so that the compressibility signal 1214 falls as low as possible. In general, tuning may be conducted on a real-time basis, but may also be conducted following denoising of a signal.

Figure 13:
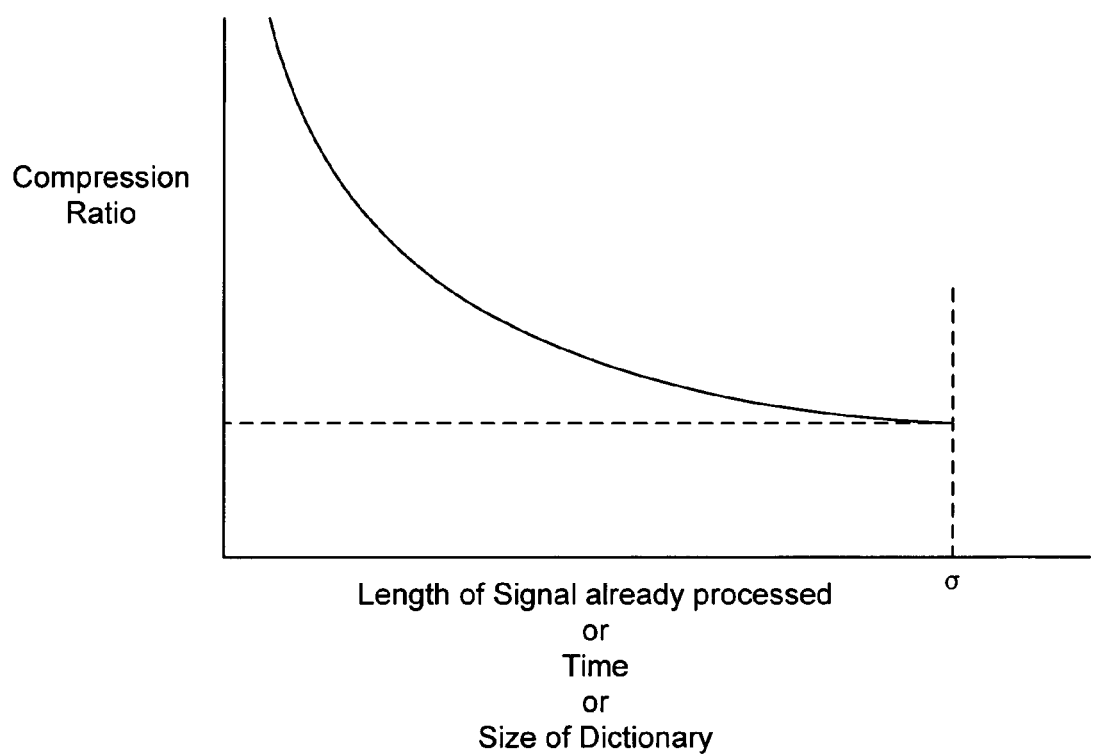
FIG. 13 shows an illustrative graph of the compression ratio versus either the length of signal already processed, the time already expended in compression, or the size of the dictionary for a Lempel-Ziv lossless compression technique, plotted with respect to the x axis.

When a lossless compression technique similar to the above-described Lempel-Ziv compression technique is used to evaluate the compressibility of the output of a denoiser, it is important that the lossless compression technique runs for a sufficient length of time to build up a reasonably sized dictionary prior to evaluating the compressibility of the denoiser output. FIG. 13 shows an illustrative graph of the compression ratio versus either the length of signal already processed, the time already expended in compression, or the size of the dictionary for a Lempel-Ziv lossless compression technique, plotted with respect to the x axis. In FIG. 13, the compression ratio is plotted with respect to a vertical axis and the length of signal already processed, the time already expended in compression, or the size of the dictionary for a Lempel-Ziv lossless compression technique is plotted with respect to the x axis. As seen in FIG. 13, the compression ratio falls rapidly in the initial stages of compression as the dictionary, or code book, is filled with metasymbols. Only after a sufficient amount of compression has taken place to populate the dictionary can the compression ratio, or rate, be used to evaluate the overall compressibility of the data stream. Thus, care must be taken to compress a sufficiently lengthy portion of the output of the denoiser in order to draw conclusions concerning the compressibility of the denoiser output from the compression ratio achieved by the compression technique.

Figure 14:
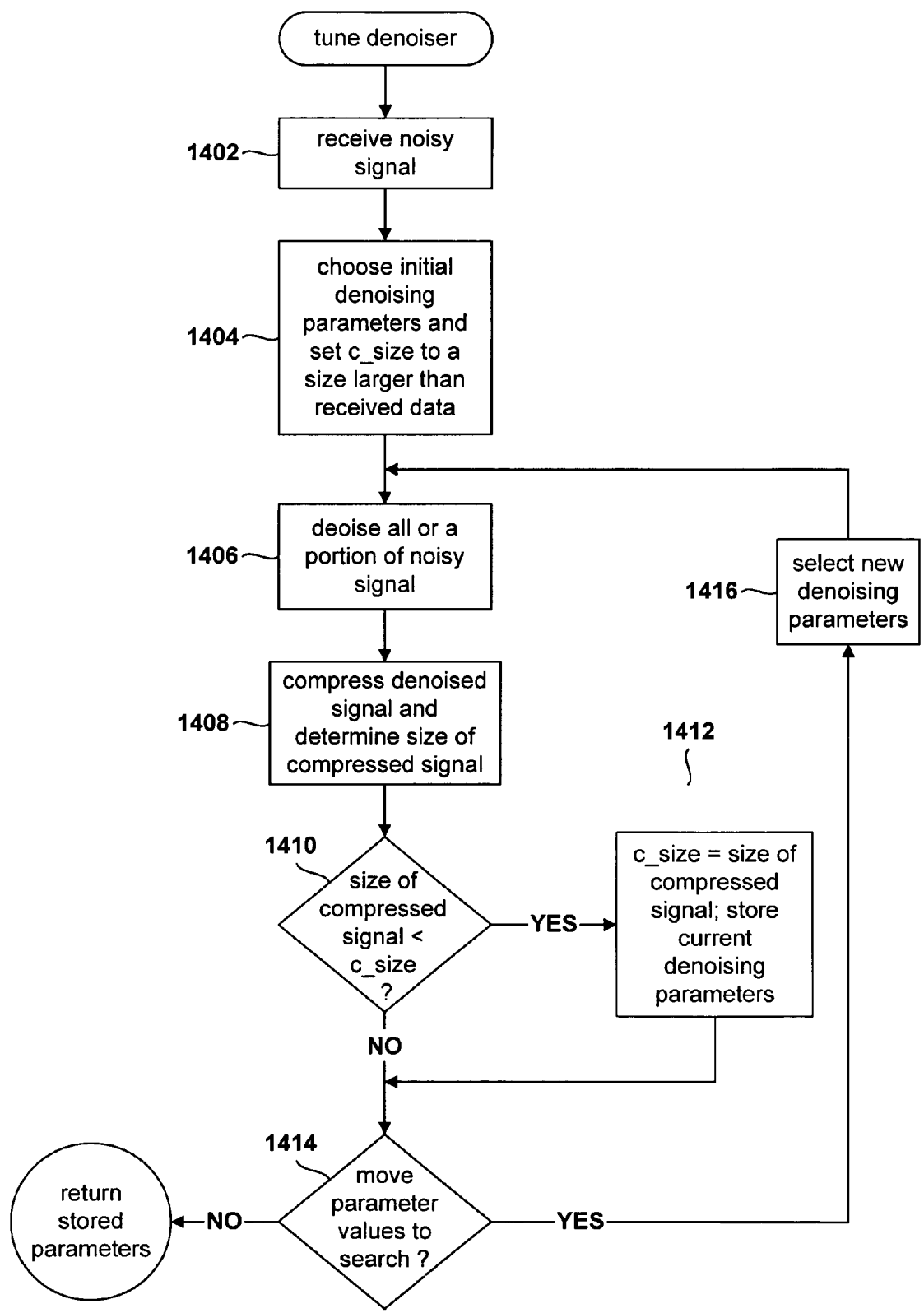
FIG. 14 is a control-flow diagram for a general embodiment of the denoiser tuning method that represents one embodiment of the present invention.

FIG. 14 is a control-flow diagram for a general embodiment of the denoiser tuning method that represents one embodiment of the present invention. In step 1402, a noisy signal is received. In step 1404, initial denoising parameters are chosen, and a variable "c_size" is set to a value greater than the length of the received noisy signal. In step 1406, a denoiser is used to denoise the received noisy signal, or a portion of the noisy signal, using the initial denoising parameters selected in step 1404. In step 1408, the output from the denoiser is compressed using a compression technique, such as the above described Lempel-Ziv technique, and the size of the compressed signal is determined. In step 1410, the size of the compressed, denoised signal is compared to the value stored in the variable "c_size." If the size of the compressed, denoised signal is less than the value stored in the variable "c_size," then the currently selected denoising parameters are the best so far evaluated, and are therefore, in step 1412, stored for subsequent access. The value of the variable "c_size" is also updated, in step 1412, to reflect the currently best compression detected by setting the value of variable "c_size" to the size of the compressed signal, determined in step 1408. Control then flows to step 1414, where the denoiser tuning method determines whether there remain additional denoiser parameters to evaluate. If more tuning is possible, then, in step 1416, new denoiser parameters are selected, and control returns to step 1406 for another round of denoising and compression evaluation. This tuning process may be used iteratively on an entire, denoised signal, or may be continuously employed within a denoiser device as a feedback loop, with relatively small sections of denoiser output compressed on a continuing basis in order to monitor compressibility of the denoiser output and continuously tune and refine the denoiser parameters as the denoiser operates on a continuously received, noisy signal.

It should be noted that many of the denoiser parameters discussed above in a previous subsection related to the DUDE, are interrelated, so that adjustment of one parameter affects the relative adjustments of other parameters. It may be sufficient to tune only one of the many possible parameters, or it may be more effective to tune two or more of the parameters, iteratively tuning a first parameter, using the turned parameter value to tune a second parameter, etc., and then repeating the process in order to search a multi-dimensional parameter space. As one example, the context length parameter k may be tuned in order to select an optimal context for denoising a one-dimensional signal. As another example, the shapes and sizes of one-dimensional and multi-dimensional contexts may be adjusted and tuned by methods representing embodiments of the present invention. In more advanced denoiser implementations, additional parameters may be available for tuning.

In many implementations, the denoiser tuning is fully automated, and carried out by a software program, logic circuits, or a combination of software and hardware implementations in order to provide feedback control of a denoiser embedded within a communications device or a software-implemented denoiser running on a computer system. It is, however, conceivable that at least a portion of the denoiser tuning may be carried out by manual intervention of a human operator.

Although the present invention has been described in terms of a particular embodiment, it is not intended that the invention be limited to this embodiment. Modifications within the spirit of the invention will be apparent to those skilled in the art. For example, any of a large variety of different types of denoisers may be tuned in various different embodiments of the present invention by monitoring the compressibility of their output. Monitoring of compressibility may employ any of a large number of different possible compression techniques. The present invention may be used for real-time, continuous feedback control of a denoiser, may be used to iteratively denoise a received signal, or may be used during denoiser development to optimize denoiser implementations and techniques.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for tuning a denoiser comprising:
    receiving a noisy signal;
    repeatedly selecting denoising parameters and evaluating the selected denosing parameters by denoising the noisy signal using a denoiser and the selected denoising parameters to produce a denoised signal, and compressing the denoised signal to produce a compressed, denoised signal having a size; and
    choosing as tuned denoising parameters the selected denoising parameters used to produce a compressed, denoised signal having a smallest size.

2. The method of claim 1 wherein selection and evaluation of denoising parameters is repeated until a specified range of denoising parameters have been evaluated.

3. The method of claim 1 wherein denoising the noisy signal using a denoiser and the selected denoising parameters further includes denoising the signal using a discrete denoiser and the selected denoising parameters.

4. The method of claim 1 wherein compressing the denoised signal to produce a compressed, denoised signal having a size further includes compressing the denoised signal by lossless compression.

5. The method of claim 1 wherein compressing the denoised signal by lossless compression further includes compressing the denoised signal by the Lempel-Ziv compression technique.

6. The method of claim 1 wherein denoising parameters include: symbol compositions of contexts within which symbols are evaluated by the denoiser; sizes of the contexts within which symbols are evaluated by the denoiser; and shapes of contexts.

7. A computer readable medium containing executable instructions which, when executed in a processing system, causes the system to perform a method for tuning a denoiser comprising:
    receiving a noisy signal;
    repeatedly selecting denoising parameters and evaluating the selected denosing parameters by denoising the noisy signal using a denoiser and the selected denoising parameters to produce a denoised signal, and compressing the denoised signal to produce a compressed, denoised signal having a size; and
    choosing as tuned denoising parameters the selected denoising parameters used to produce a compressed, denoised signal having a smallest size.

8. A method for tuning a denoiser comprising:
    receiving a noisy signal;
    repeatedly selecting denoising parameters and evaluating the selected denosing parameters by denoising the noisy signal using a denoiser and the selected denoising parameters to produce a denoised signal, and analyzing the denoised signal to determine a denoised-signal entropy; and
    choosing as tuned denoising parameters the selected denoising parameters used to produce a denoised signal having a smallest denoised-signal entropy.

9. The method of claim 8 wherein selection and evaluation of denoising parameters is repeated until a specified range of denoising parameters have been evaluated.

10. The method of claim 8 wherein denoising the noisy signal using a denoiser further includes denoising the signal using a discrete denoiser.

11. The method of claim 8 wherein denoising parameters include: symbol compositions of contexts within which symbols are evaluated by the denoiser; sizes of the contexts within which symbols are evaluated by the denoiser; and shapes of contexts.

12. A computer readable medium containing executable instructions which, when executed in a processing system, causes the system to perform a method for tuning a denoiser comprising:
    receiving a noisy signal;
    repeatedly selecting denoising parameters and evaluating the selected denosing parameters by denoising the noisy signal using a denoiser and the selected denoising parameters to produce a denoised signal, and analyzing the denoised signal to determine a denoised-signal entropy; and
    choosing as tuned denoising parameters the selected denoising parameters used to produce a denoised signal having a smallest denoised-signal entropy.

13. A denoiser tuner comprising:

a means for receiving a signal;

a denoising component that denoises the signal to produce a denoised signal; and a denoising evaluation component that analyzes the denoised signal to determine a denoised-signal entropy and that compares the denoised-signal entropy to a stored, previously determined denoised-signal entropy wherein the denoising component and denoiser evaluation component operate by:

receiving a noisy signal;

repeatedly selecting denoising parameters and evaluating the selected denosing parameters by denoising the noisy signal using a denoiser and the selected denoising parameters to produce a denoised signal, and analyzing the denoised signal to determine a denoised-signal entropy; and choosing as tuned denoising parameters the selected denoising parameters used to produce a denoised signal having a smallest denoised-signal entropy.

14. The denoiser tuner of claim 13, wherein the denoiser is a discrete denoiser.

15. The denoiser tuner of claim 13 wherein denoising parameters include: symbol compositions of contexts within which symbols are evaluated by the denoiser; sizes of the contexts within which symbols are evaluated by the denoiser; and shapes of contexts.

* * * * *

UNITED STATES PATENT AND TRADEMARK OFFICE
CERTIFICATE OF CORRECTION

PATENT NO. : 7,436,969 B2
APPLICATION NO. : 10/934200
DATED : October 14, 2008
INVENTOR(S) : Gadiel Seroussi et al.

It is certified that error appears in the above-identified patent and that said Letters Patent is hereby corrected as shown below:

In column 2, line 2, delete ""$\alpha_\alpha$."" and insert -- "$a_\alpha$" --, therefor.

In column 2, line 3, delete ""$\alpha_x$."" and insert -- "$a_x$" --, therefor.

In column 2, line 4, delete " $\lambda_{\alpha_x} \Box \pi_{\alpha_x}$ " and insert -- $\lambda_{a_x} \Box \pi_{a_x}$ --, therefor.

In column 2, line 6, delete "$\alpha_\alpha$" and insert -- $a_\alpha$ --, therefor.

In column 2, line 6, delete "b$\alpha_\alpha$c" and insert -- b$a_\alpha$c --, therefor.

In column 2, line 7, delete "$\alpha_x$" and insert -- $a_x$ --, therefor.

In column 2, line 9, delete ""$\alpha_1$"-"$\alpha_n$"" and insert --"$a_1$"-"$a_n$" --, therefor.

In column 2, line 43, delete "A=($\alpha_1,\alpha_2,\alpha_3, ...\alpha_n$)" and insert -- A=($a_1,a_2,a_3, ...a_n$) --, therefor.

In column 2, line 61, delete ""$\alpha_9$,"" and insert -- "$a_9$," --, therefor.

In column 2, line 62, delete ""$\alpha_2$"" and insert -- "$a_2$" --, therefor.

In column 3, line 50, delete ""$\alpha_2$"" and insert -- "$a_2$" --, therefor.

In column 3, line 53, delete ""$\alpha_2$"" and insert -- "$a_2$" --, therefor.

In column 3, lines 53-54, delete "["$\alpha_3$," "$\alpha_1$"]" and insert -- ["$a_3$," "$a_1$,"] --, therefor.

In column 3, line 55, delete ""$\alpha_i$"" and insert -- "$a_i$" --, therefor.

In column 3, line 56, delete ""$\alpha_i$"" and insert -- "$a_i$" --, therefor.

In column 3, line 57, delete ""$\alpha_j$."" and insert -- "$a_j$." --, therefor.

Signed and Sealed this

Twentieth Day of July, 2010

David J. Kappos
*Director of the United States Patent and Trademark Office*

In column 3, line 59, delete "$\alpha_2$" and insert -- "$a_2$" --, therefor.

In column 3, line 60, delete "["$\alpha_3$," "$\alpha_1$"]" and insert -- ["$a_3$," "$a_1$"] --, therefor.

In column 3, line 60, delete ""$\alpha_9$"" and insert -- "$a_9$" --, therefor.

In column 3, line 66, delete ""$\alpha_2$"" and insert -- "$a_2$" --, therefor.

In column 3, line 67, delete ""$\alpha_9$"" and insert -- "$a_9$" --, therefor.

In column 4, line 2, delete ""$\alpha_2$"" and insert -- "$a_2$" --, therefor.

In column 4, line 2, delete ""$\alpha_9$"" and insert -- "$a_9$" --, therefor.

In column 4, line 22, delete ""$\alpha_i$"" and insert -- "$a_i$," --, therefor.

In column 4, line 22, delete ""$\alpha_j$"" and insert -- "$a_j$" --, therefor.

In column 4, line 24, delete ""$\alpha_6$"" and insert -- "$a_6$" --, therefor.

In column 4, line 26, delete ""$\alpha_6$"" and insert -- "$a_6$" --, therefor.

In column 4, line 28, delete ""$\alpha_6$"" and insert -- "$a_6$" --, therefor.

In column 4, line 29, delete ""$\alpha_1$"" and insert -- "$a_1$" --, therefor.

In column 4, line 31, delete ""$\alpha_6$" and "$\alpha_1$"" and insert -- "$a_6$" and "$a_1$" --, therefor.

In column 4, line 32, delete ""$\alpha_6$"" and insert -- "$a_6$" --, therefor.

In column 4, line 35, delete ""$\alpha_6$"" and insert -- "$a_6$" --, therefor.

In column 4, line 35, delete ""$\alpha_6$."" and insert -- "$a_6$." --, therefor.

In column 4, line 42, delete ""$\alpha_i$"" and insert -- "$a_i$" --, therefor.

In column 4, line 44, delete ""$\alpha_j$."" and insert -- "$a_j$." --, therefor.

In column 4, line 45, delete " $\pi_{\alpha_j}$ " and insert -- $\pi_{a_j}$ --, therefor.

In column 4, line 49, delete ""$\alpha_5$"" and insert -- "$a_5$" --, therefor.

In column 4, line 50, delete "$m^{clean}[\alpha_5]$" and insert -- $m^{clean}[a_5]$ --, therefor.

In column 4, line 53, delete ""$\alpha_i$"" and insert -- "$a_i$" --, therefor.

In column 4, line 60, delete "$\alpha_i$" and insert -- $a_i$ --, therefor.

CERTIFICATE OF CORRECTION (continued)
U.S. Pat. No. 7,436,969 B2

In column 4, line 62, delete "$\alpha_i$" and insert -- $a_i$ --, therefor.

In column 5, line 62, delete ""$\alpha_6$"" and insert -- "$a_6$" --, therefor.

In column 5, line 63, delete ""$\alpha_9\alpha_2$"" and insert -- "$a_9a_2$" --, therefor.

In column 5, line 64, delete ""$\alpha_1\alpha_3$"" and insert -- "$a_1a_3$" --, therefor.

In column 5, line 65, delete ""$\alpha_6$"" and insert -- "$a_6$" --, therefor.

In column 5, line 66, delete "["$\alpha_1\alpha_3$," "$\alpha_9\alpha_2$"]" and insert -- ["$a_1a_3$," "$a_9a_2$"] --, therefor.

In column 5, line 67, delete ""$\alpha_1\alpha_3\alpha_6\alpha_9\alpha_2$"" and insert -- "$a_1a_3a_6a_9a_2$" --, therefor.

In column 6, line 7, delete ""$\alpha_9$"" and insert -- "$a_9$" --, therefor.

In column 6, lines 7-8, delete "["$\alpha_3\alpha_6$," "$\alpha_2\alpha_{17}$"]" and insert -- ["$a_3a_6$," "$a_2a_{17}$"] --, therefor.

In column 6, line 36, delete ""$\alpha_3$"" and insert -- "$a_3$" --, therefor.

In column 6, line 38, delete ""$\alpha_3$"" and insert -- "$a_3$" --, therefor.

In column 6, line 39, delete ""$\alpha_3$"" and insert -- "$a_3$" --, therefor.

In column 6, line 41, delete "["$\alpha_7\alpha_3\alpha_6$," "$\alpha_5\alpha_5\alpha_5$"]" and insert -- ["$a_7a_3a_6$," "$a_5a_5a_5$"] --, therefor.

In column 6, line 42, delete ""$\alpha_3$"" and insert -- "$a_3$" --, therefor.

In column 6, line 42, delete "["$\alpha_7\alpha_3\alpha_6$," "$\alpha_5\alpha_5\alpha_5$"]" and insert -- ["$a_7a_3a_6$," "$a_5a_5a_5$"] --, therefor.

In column 6, line 43, delete ""$\alpha_3$"" and insert -- "$a_3$" --, therefor.

In column 6, line 44, delete "["$\alpha_7\alpha_3\alpha_6$," "$\alpha_5\alpha_5\alpha_5$"]" and insert -- ["$a_7a_3a_6$," "$a_5a_5a_5$"] --, therefor.

In column 6, lines 45-46, delete "["$\alpha_7\alpha_3\alpha_6$," "$\alpha_5\alpha_5\alpha_5$"]" and insert -- ["$a_7a_3a_6$," "$a_5a_5a_5$"] --, therefor.

In column 6, line 46, delete ""$\alpha_3$"" and insert -- "$a_3$" --, therefor.

In column 6, line 47, delete "["$\alpha_7\alpha_3\alpha_6$," "$\alpha_5\alpha_5\alpha_5$"]" and insert -- ["$a_7a_3a_6$," "$a_5a_5a_5$"] --, therefor.

In column 6, line 49, delete ""$\alpha_1$," "$\alpha_2$"" and insert -- "$a_1$," "$a_2$" --, therefor.

In column 6, line 49, delete ""$\alpha_4$"-"$\alpha_n$"" and insert -- "$a_4$"-"$a_n$" --, therefor.

In column 6, lines 49-50, delete "["$\alpha_7\alpha_3\alpha_6$," "$\alpha_5\alpha_5\alpha_5$"]" and insert -- ["$a_7a_3a_6$," "$a_5a_5a_5$"] --, therefor.

CERTIFICATE OF CORRECTION (continued)
U.S. Pat. No. 7,436,969 B2

In column 6, lines 51-52, delete "m($s_{noisy}$, "$\alpha_7\alpha_3\alpha_6$", "$\alpha_5\alpha_5\alpha_5$")" and insert -- m($s_{noisy}$, "a₇a₃a₆", "a₅a₅a₅") --, therefor.

In column 6, line 55, delete ""$\alpha_3$"" and insert -- "a₃" --, therefor.

In column 6, line 55, delete "["$\alpha_7\alpha_3\alpha_6$," "$\alpha_5\alpha_5\alpha_5$"]" and insert -- ["a₇a₃a₆," "a₅a₅a₅"] --, therefor.

In column 6, lines 56-57, delete "m($s_{noisy}$, "$\alpha_7\alpha_3\alpha_6$", "$\alpha_5\alpha_5\alpha_5$")[$\alpha_3$]" and insert -- m($s_{noisy}$, "a₇a₃a₆", "a₅a₅a₅")[a₃] --, therefor.

In column 7, line 46, delete " $d_{\alpha_i \to \alpha_j}$ " and insert -- $d_{a_i \to a_j}$ --, therefor.

In column 7, line 48, delete ""$\alpha_j$"" and insert -- "a_j" --, therefor.

In column 7, line 48, delete ""$\alpha_i$"" and insert -- "a_i" --, therefor.

In column 7, line 50, delete " $\lambda_{\alpha_j}$ " and insert -- $\lambda_{a_j}$ --, therefor.

In column 7, line 53, delete ""$\alpha_\alpha$"" and insert -- "$a_\alpha$" --, therefor.

In column 7, line 53, delete ""$\alpha_x$"" and insert -- "$a_x$" --, therefor.

In column 7, line 55, delete " $\lambda_{\alpha_j}$ and $\pi_{\alpha_\alpha}$ " and insert -- $\lambda_{a_j}$ and $\pi_{a_\alpha}$ --, therefor.

In column 7, line 58, delete " $\lambda_{\alpha_x} \square \pi_{\alpha_\alpha}$ " and insert -- $\lambda_{a_x} \square \pi_{a_\alpha}$ --, therefor.

In column 7, line 59, delete " $d_{\alpha_i \to \alpha_x} p_{\alpha_i \to \alpha_\alpha}$ " and insert -- $d_{a_i \to a_x} p_{a_i \to a_\alpha}$ --, therefor.

In column 7, line 61, delete "$\alpha_\alpha$" and insert -- $a_\alpha$ --, therefor.

In column 7, line 61, delete ""$\alpha_x$"" and insert -- "$a_x$" --, therefor.

In column 7, line 63, delete ""$\alpha_i$."" and insert -- "$a_i$." --, therefor.

In column 7, line 64, delete " $\lambda_{\alpha_x} \square \pi_{\alpha_\alpha}$ " and insert -- $\lambda_{a_x} \square \pi_{a_\alpha}$ --, therefor.

In column 7, line 65, delete ""$\alpha_\alpha$"" and insert -- "$a_\alpha$" --, therefor.

In column 7, line 66, delete "b$\alpha_\alpha$c" and insert -- ba$_\alpha$c --, therefor.

In column 7, line 67, delete ""$\alpha_x$"" and insert -- "$a_x$" --, therefor.

In column 8, line 9, delete " $q(s_{noisy}, s_{clean}, b, c)[\alpha_\alpha] = |\{i : s_{clean}[i] = \alpha_\alpha, (s_{noisy}[i-k]),$ " and insert -- $q(s_{noisy}, s_{clean}, b, c)[a_\alpha] = |\{i : s_{clean}[i] = a_\alpha (s_{noisy}[i-k]),$ --, therefor.

CERTIFICATE OF CORRECTION (continued)
U.S. Pat. No. 7,436,969 B2

In column 8, line 14, delete "$\alpha_\alpha$" and insert -- $a_\alpha$ --, therefor.

In column 8, line 17, delete "$\alpha_\alpha$ from "$\alpha_1$" to "$\alpha_n$," and insert -- $a_\alpha$ from "$a_1$" to "$a_n$," --, therefor.

In column 8, line 22, delete " $\lambda_{\alpha_x} \Box \pi_{\alpha_\alpha}$ " and insert -- $\lambda_{a_x} \Box \pi_{a_\alpha}$ --, therefor.

In column 8, line 26, delete ""$\alpha_\alpha$"" and insert -- "$a_\alpha$" --, therefor.

In column 8, line 26, delete "$b\alpha_\alpha c$" and insert -- $ba_\alpha c$ --, therefor.

In column 8, line 26, delete ""$\alpha_x$"" and insert -- "$a_x$" --, therefor.

In column 8, line 30, delete " $[\alpha_1](p_{\alpha_1 \to \alpha_\alpha} d_{\alpha_1 \to \alpha_x})$ " and insert -- $[a_1](p_{a_1 \to a_\alpha} d_{a_\alpha \to a_x})$ --, therefor.

In column 8, line 32, delete ""$\alpha_\alpha$" by "$\alpha_x$"" and insert -- "$a_\alpha$" by "$a_x$" --, therefor.

In column 8, line 32, delete "$b\alpha_\alpha c$" and insert -- $ba_\alpha c$ --, therefor.

In column 8, line 33, delete "$\alpha_1$" and insert -- $a_1$ --, therefor.

In column 8, line 56, delete ""$\alpha_1$"-"$\alpha_n$"" and insert -- "$a_1$"-"$a_n$" --, therefor.

In column 8, line 58, delete " $m^r(s_{notsy}, b, c) \Pi^{-1}(\lambda_{\alpha_x} \Box \pi_{\alpha_\alpha})$ " and insert -- $m^r(s_{notsy}, b, c) \Pi^{-1}(\lambda_{a_x} \Box \pi_{a_\alpha})$ --, therefor.

In column 8, line 63, delete ""$\alpha_x$,"" and insert -- "$a_x$," --, therefor.

In column 8, line 63, delete ""$\alpha_\alpha$"" and insert -- "$a_\alpha$" --, therefor.

In column 8, line 65, delete ""$\alpha_\alpha$"" and insert -- "$a_\alpha$" --, therefor.

In column 8, line 66, delete "$b\alpha_\alpha c$" and insert -- $ba_\alpha c$ --, therefor.

In column 8, line 66, delete ""$\alpha_x$"" and insert -- "$a_x$" --, therefor.

In column 9, line 2, delete "$b\alpha_\alpha c$" and insert -- $ba_\alpha c$ --, therefor.

In column 9, line 4, delete "$\alpha_\alpha$" and insert -- $a_\alpha$ --, therefor.

In column 9, line 13, delete "$\alpha_x$" and insert -- $a_x$ --, therefor.

In column 9, line 14, delete "$\alpha_\alpha$" and insert -- $a_\alpha$ --, therefor.

In column 9, line 18, delete ""$\alpha_i$"" and insert -- "$a_i$" --, therefor.

In column 9, line 25, delete ""$\alpha_\alpha$"" and insert -- "$a_\alpha$" --, therefor.

In column 9, line 26, delete ""$\alpha_i$"" and insert -- "$a_i$" --, therefor.

In column 9, line 34, delete ""$\alpha_3$"" and insert -- "$a_3$" --, therefor.

In column 9, line 35, delete ""$\alpha_\alpha$"" and insert -- "$a_\alpha$" --, therefor.

In column 9, line 36, delete ""$\alpha_3$"" and insert -- "$a_3$" --, therefor.

In column 9, line 64, delete " $\lambda_{\alpha_x} \square \pi_{\alpha_D}$ " and insert -- $\lambda_{a_s} \square \pi_{a_s}$ --, therefor.

In column 9, line 67, delete " $\lambda_{\alpha_x} \square \pi_{\alpha_D}$ " and insert -- $\lambda_{a_s} \square \pi_{a_s}$ --, therefor.